(12) United States Patent
Kato et al.

(10) Patent No.: US 9,049,049 B2
(45) Date of Patent: Jun. 2, 2015

(54) ROUTING METHOD IN IN-VEHICLE GATEWAY DEVICE

(75) Inventors: Seiya Kato, Yokohama (JP); Akitoshi Shimura, Yokohama (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 1534 days.

(21) Appl. No.: 12/581,290

(22) Filed: Oct. 19, 2009

(65) Prior Publication Data

US 2010/0098095 A1    Apr. 22, 2010

(30) Foreign Application Priority Data

Oct. 20, 2008    (JP) .................................. 2008-269318

(51) Int. Cl.
| | |
|---|---|
| H04L 12/56 | (2006.01) |
| H04L 12/54 | (2013.01) |
| H04L 12/46 | (2006.01) |
| H04L 12/66 | (2006.01) |
| H04L 12/725 | (2013.01) |
| H04L 12/721 | (2013.01) |
| H04L 12/801 | (2013.01) |
| H04L 29/08 | (2006.01) |
| H04L 12/40 | (2006.01) |
| H04L 29/06 | (2006.01) |

(52) U.S. Cl.
CPC ......... *H04L 12/5692* (2013.01); *H04L 12/4013* (2013.01); *H04L 12/4625* (2013.01); *H04L 12/5695* (2013.01); *H04L 12/66* (2013.01); *H04L 45/306* (2013.01); *H04L 45/70* (2013.01); *H04L 47/14* (2013.01); *H04L 63/0428* (2013.01); *H04L 2012/40273* (2013.01); *H04L 67/12* (2013.01)

(58) Field of Classification Search
None
See application file for complete search history.

(56) References Cited

U.S. PATENT DOCUMENTS

| | | | | |
|---|---|---|---|---|
| 6,965,604 | B1 * | 11/2005 | Sato et al. ...................... | 370/401 |
| 7,593,032 | B2 * | 9/2009 | Civanlar et al. ............ | 348/14.09 |
| 2002/0122394 | A1 * | 9/2002 | Whitmore et al. ............ | 370/328 |
| 2006/0013237 | A1 * | 1/2006 | Furuta et al. .................. | 370/401 |
| 2007/0112991 | A1 | 5/2007 | Bahren | |
| 2007/0133578 | A1 * | 6/2007 | Tani .............................. | 370/401 |
| 2008/0043759 | A1 * | 2/2008 | Poetker et al. ................ | 370/401 |
| 2008/0101394 | A1 * | 5/2008 | Noumi et al. ................. | 370/401 |
| 2008/0219274 | A1 * | 9/2008 | Kato et al. .................... | 370/401 |
| 2008/0304499 | A1 * | 12/2008 | Jeon et al. ..................... | 370/401 |
| 2010/0329272 | A1 * | 12/2010 | Tsuboi et al. ................. | 370/401 |

FOREIGN PATENT DOCUMENTS

| | | |
|---|---|---|
| DE | 10 2004 059 981 | 6/2006 |
| EP | 1 309 132 | 5/2003 |
| EP | 1 956 794 | 8/2008 |

(Continued)

*Primary Examiner* — Hassan Kizou
*Assistant Examiner* — Roberta A Shand
(74) *Attorney, Agent, or Firm* — Baker Botts L.L.P.

(57) ABSTRACT

A routing method and an in-vehicle gateway device having a plurality of interfaces for communication, automatic setting of routing function is enabled to perform, in consideration of characteristics of data which a connecting network handles. A network is classified to an information-system, a control-system and a safety-system, based on characteristics thereof, and which one of the systems includes a network connecting to the in-vehicle gateway device, is judged from equipments connecting to the network, or traffic of the network. Still more processing in data exchange among different classifications is set in advance.

6 Claims, 15 Drawing Sheets

(56) References Cited

FOREIGN PATENT DOCUMENTS

| JP | 2003-309584 | 10/2003 |
| JP | 2004-343626 | 12/2004 |
| JP | 2006-506862 | 2/2006 |
| JP | 2006-352553 | 12/2006 |
| JP | 2008-193572 | 8/2008 |
| JP | 2008-227798 | 9/2008 |
| WO | WO 2004/047385 A3 | 6/2004 |

* cited by examiner

FIG. 7

| EQUIPMENT IDENTIFIER | INPUT DATA IDENTIFIER | OUTPUT DATA IDENTIFIER |
|---|---|---|
| #110 (CAR NAVIGATION DEVICE) | #121 (UPDATED MAP INFORMATION) | – |
| | #152 (WHEEL ROTATION NUMBER) | – |
| | #153 (INFORMATION ON BRAKE PAD DETERIORATION) | – |
| | – | #111 (CURVATURE OF CURVE AHEAD) |
| #120 (DCM) | #153 (INFORMATION ON BRAKE PAD DETERIORATION) | – |
| | #161 (AIRBAG OPERATION INFORMATION) | – |
| | – | #121 (UPDATED MAP INFORMATION) |
| #130 (ENGINE ECU) | #151 (STEP DEPTH OF BRAKE) | – |
| | #161 (AIRBAG OPERATION INFORMATION) | – |
| #140 (STEERING ECU) | #111 (CURVATURE OF CURVE AHEAD) | – |
| | #161 (AIRBAG OPERATION INFORMATION) | – |
| #150 (BRAKING ECU) | #111 (CURVATURE OF CURVE AHEAD) | – |
| | #161 (AIRBAG OPERATION INFORMATION) | – |
| | – | #151 (STEP DEPTH OF BRAKE) |
| | – | #152 (WHEEL ROTATION NUMBER) |
| | – | #153 (INFORMATION ON BRAKE PAD DETERIORATION) |
| #160 (AIRBAG ECU) | – | #161 (AIRBAG OPERATION INFORMATION) |

FIG. 8

| NETWORK CLASSIFICATION | TYPICAL EQUIPMENT IDENTIFIER |
|---|---|
| INFORMATION SYSTEM | #110 (CAR NAVIGATION DEVICE) |
| CONTROL SYSTEM | #130 (ENGINE ECU) |
| | #160 (BRAKING ECU) |
| SAFETY SYSTEM | #170 (AIRBAG ECU) |

FIG. 9

| INPUT DATA IDENTIFIER | INPUT I/F | OUTPUT I/F |
|---|---|---|
| #111 (CURVATURE OF CURVE AHEAD) | THE FIRST COMMUNICATION I/F | THE THIRD COMMUNICATION I/F |
| #151 (STEP DEPTH OF BRAKE) | THE THIRD COMMUNICATION I/F | THE SECOND COMMUNICATION I/F |
| #152 (WHEEL ROTATION NUMBER) | THE THIRD COMMUNICATION I/F | THE FIRST COMMUNICATION I/F |
| #153 (INFORMATION ON BRAKE PAD DETERIORATION) | THE THIRD COMMUNICATION I/F | THE FIRST COMMUNICATION I/F |
| #161 (AIRBAG OPERATION INFORMATION) | THE FOURTH COMMUNICATION I/F | THE FIRST COMMUNICATION I/F |
| | | THE SECOND COMMUNICATION I/F |
| | | THE THIRD COMMUNICATION I/F |

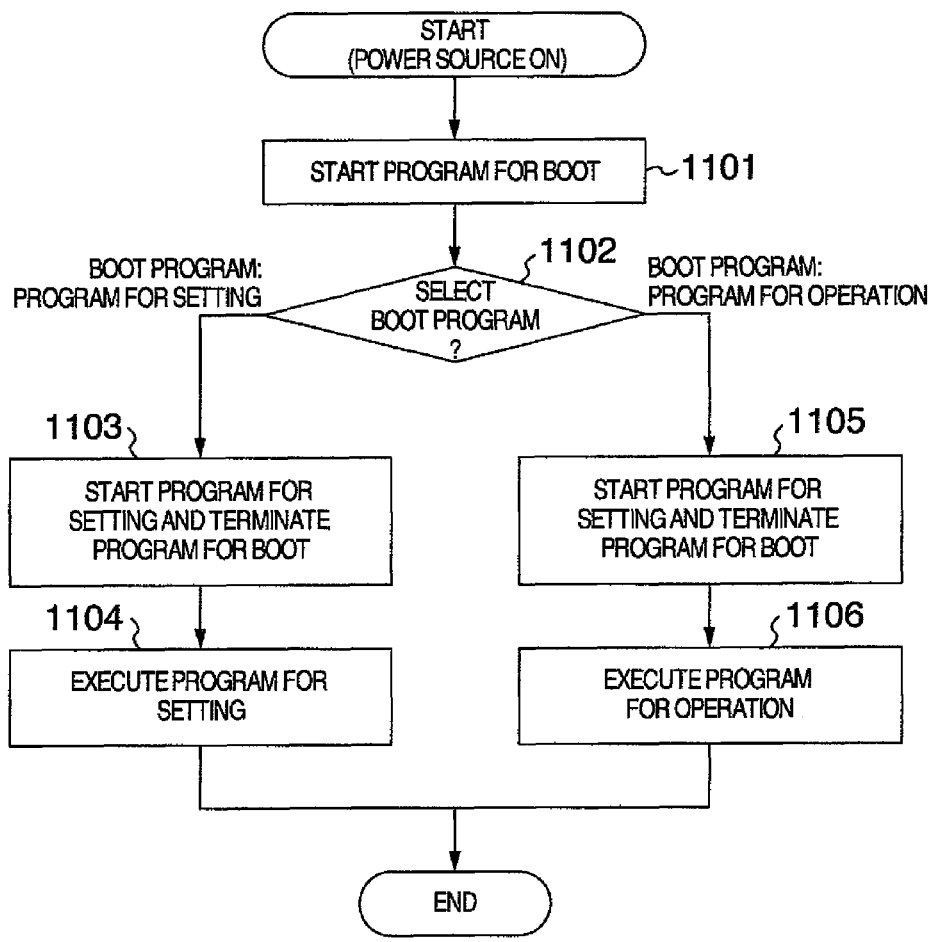

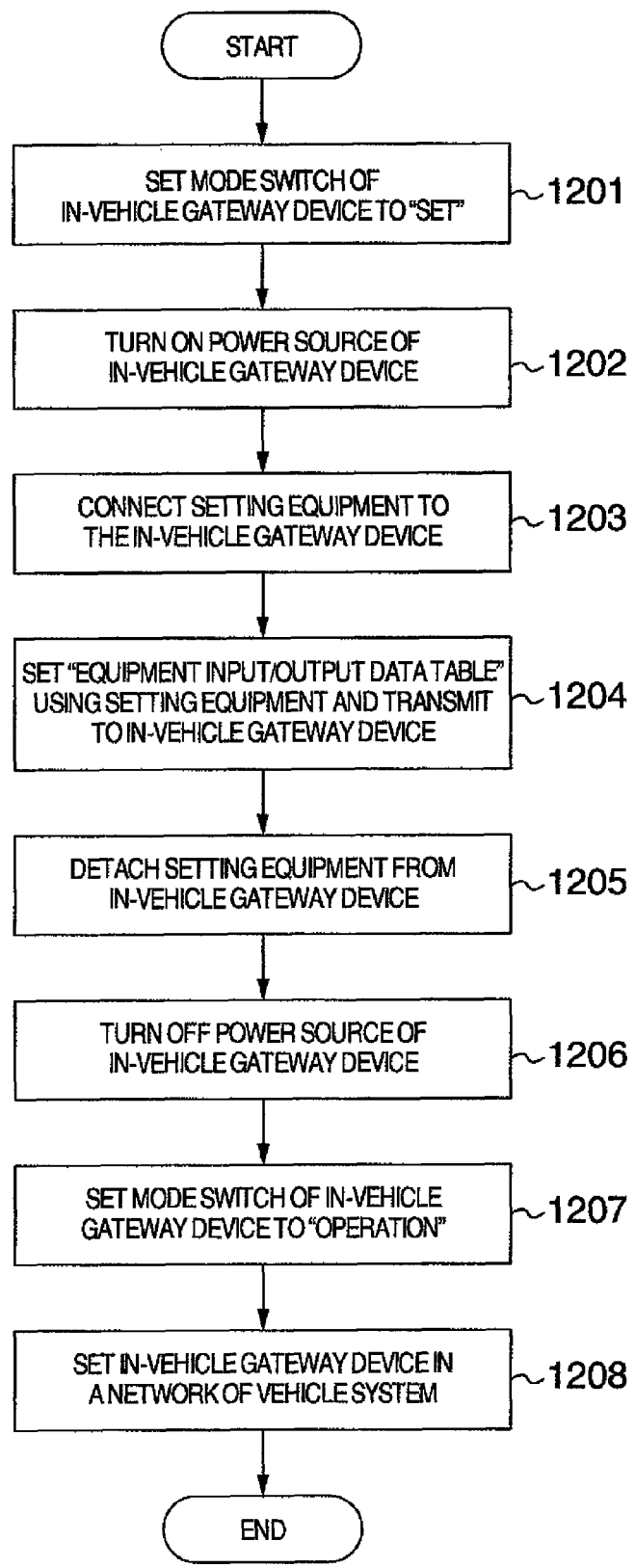

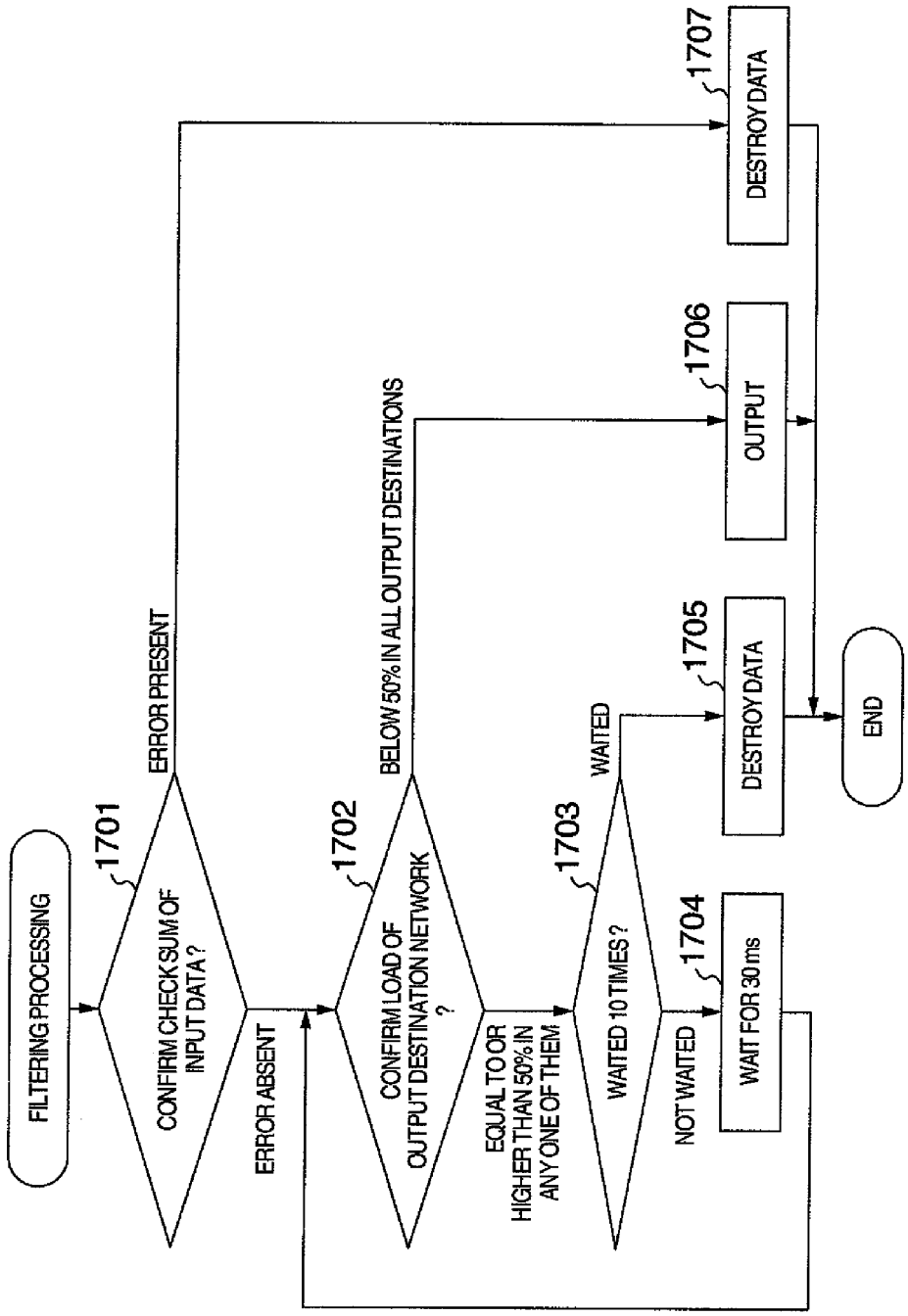

ROUTING METHOD IN IN-VEHICLE GATEWAY DEVICE

INCORPORATION BY REFERENCE

The present application claims priority from Japanese application JP2008-269318 filed on Oct. 20, 2008, the content of which is hereby incorporated by reference into this application.

BACKGROUND OF THE INVENTION

The present invention relates to an in-vehicle gateway device and a routing method thereby.

In recent years, with rise of requests for safety improvement and environmental response in an automobile, computerization to attain high-degree processing has been progressing, and the number of an ECU (Electric Control Unit) equipped on one vehicle has been increasing year by year. Increase in number of this ECU has increased bus number for connecting the ECU as well. In response to this trend, development of a microcomputer for an integrated gateway, which becomes a hub for connecting a plurality of networks, or making a hierarchical structure of a bus using a plurality of in-vehicle gateway devices has been progressing.

The in-vehicle gateway device requires function for routing the data between connecting networks, however, routing function differs depending on vehicle kind or place on a network where the in-vehicle gateway device is installed. Therefore, in development of a vehicle, separate designing for each routing function generates, and saving of this labor hour has been required.

In order to solve this problem, in JP-A-2006-506862 (Patent Document 1), at least one module theory-based software gateway is used in an in-vehicle gateway device for connecting a plurality of buses, wherein this software gateway performs routing of message between just two sub-networks, and in this way separate connection routes are supplied.

In addition, in JP-A-2003-309584 (Patent Document 2), protocol conversion is performed in the case of performing the data sending and receiving among networks with a different communication protocol.

SUMMARY OF THE INVENTION

By using technology disclosed in Patent Document 1, routing function among a plurality of networks can be provided. However, the conventional technology has not taken consideration on characteristics of a network, such as a network where emergency data is flown, or a network where data relating to vehicle control is flown. Therefore, connection of networks with different characteristics, without being conscious of characteristic thereof, could not well use characteristic thereof.

In technology disclosed in Patent Document 2, difference between networks using the same communication protocol has not been considered. Therefore, in the case where protocol conversion for encrypting data is performed in transmitting data from a control-system network to an information-system network, it could not respond to transmit the emergency data and having no requirement of encryption, from the control-system to the information-system.

Under these circumstances, it is an object of the present invention to provide a device and a method making possible to perform automatic setting of routing function, in consideration of characteristics by each network.

A network is classified, based on data flowing in each network and from network characteristics, to an information-system for exchanging the information by connecting to outside of a vehicle, a control-system for exchanging the data for performing the vehicle control, and a safety-system where emergency data is flown in an event way. Processing and editing of input data in giving and receiving data between networks with different classifications is performed.

By setting equipments connecting to a network in a vehicle system and a list of data which the equipments input and output, in advance, routing function in consideration of characteristics of a network can be set, only by setting the in-vehicle gateway device in a vehicle system, and labor hour to separately corresponding to each vehicle kind and installation place can be saved. Therefore, according to the present invention, it is possible to perform automatic setting of routing function, in consideration of characteristics by each network.

Other objects features, and advantages of the present invention will become more apparent from the following description when taken in conjunction with the accompanying drawings.

BRIEF DESCRIPTION OF THE DRAWINGS

FIG. 7 is a drawing showing a list of I/O data by each device in a vehicle system.

FIG. 8 is a drawing showing a typical equipment table representing a network classification.

FIG. 9 is a drawing showing a routing table in an in-vehicle gateway device.

FIG. 10 is a drawing showing a classification table of networks connected to an in-vehicle gateway device.

FIG. 11 is a drawing showing a processing flow in startup of an in-vehicle gateway device.

FIG. 12 is a drawing showing a processing flow of setting process by a setting operator.

FIG. 17 is a drawing showing a processing flow of routing processing from an information-system to a control-system of an in-vehicle gateway device.

DESCRIPTION OF THE EMBODIMENTS

Explanation will be given below on a first embodiment and a second embodiment.

[Embodiment 1]

Figure 1:
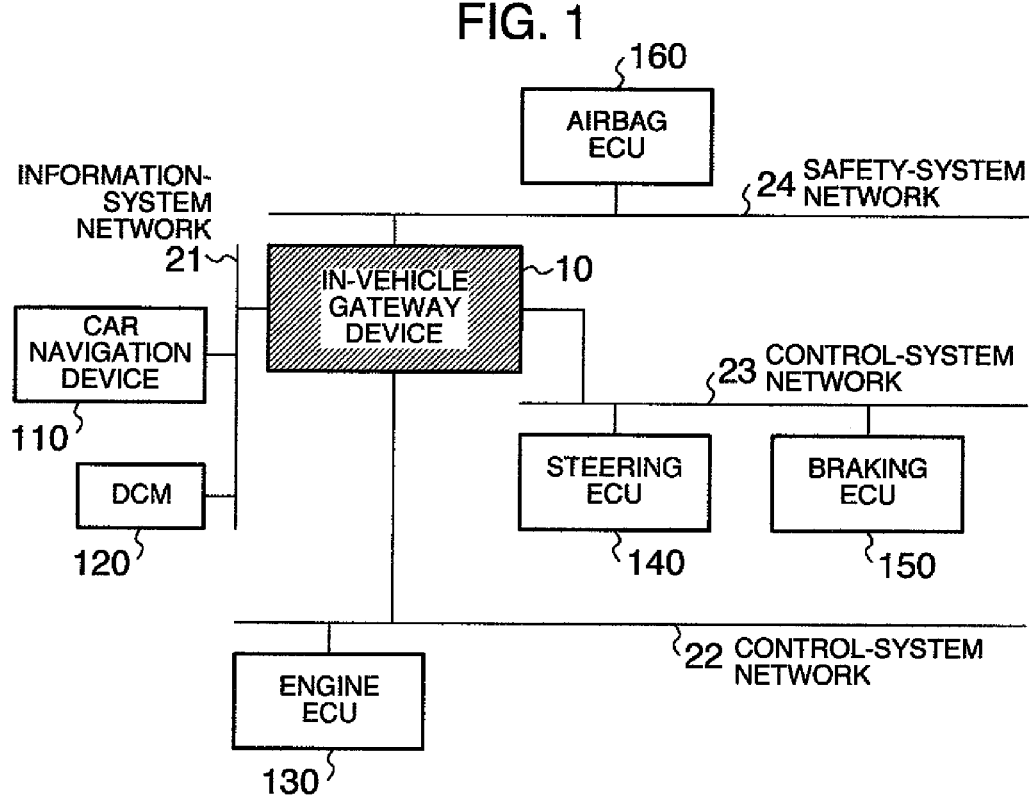
FIG. 1 is a drawing showing a configuration example of a vehicle system.

FIG. 1 is a configuration example of a vehicle system. As shown in this FIG. 1, the vehicle system of the present embodiment is configured by four networks including an information-system network 21, a control-system network 22, a control-system network 23 and a safety-system network 24, and an in-vehicle gateway device 10 for connecting these four networks.

To the information-system network 21, an in-vehicle information-system device is connected, such as a car navigation device 110, a DCM (Data Communication Module) 120 for performing communication with outside of a vehicle, or a GPS (Global Positioning System) for detecting position information of a vehicle not described in FIG. 1. In the information-system network 21, information exchange between in-vehicle information-system devices is performed. For example, from the DCM 120, the latest peripheral map information for updating map information is transmitted to the information-system network 21, in an event way. In addition, for example, from the GPS, information on present vehicle position is transmitted to the information-system network 21 in a one second interval. The information-system network 21 is a network in accordance with standards such as, for example, CAN (Controller Area Network), IEEE 1394 or MOST (Media Oriented Systems Transport).

To the control-system network 22, there are connected an engine ECU 130, which is an ECU (Electric Control Unit) for controlling an engine, or devices relating to a power train or transmission such as an automatic transmission apparatus, not described in FIG. 1. Data flowing in the control-system network 22 is data such as rotation number of an engine or residual volume of fuel. For example, engine control by the engine ECU connected to the control-system network 22 is required to have an accuracy of a several-ten millisecond unit, and similar time accuracy is required also for data to be acquired from the network. Therefore, data flowing in the control-system network 22 is data which is flown in a several-ten millisecond cycle for a cyclic one. In addition, in order not to stop the control even in failure of data sending and receiving, data is transmitted in redundant way from the beginning. The control-system network 22 is a network in accordance with standards such as, for example, CAN and Flex Ray.

To the control-system network 23, there are connected devices such as a steering ECU 150 for controlling steering operation, or a braking ECU 160 for controlling a brake. Data flowing in the control-system network 23 is data such as step depth of a brake or steering angle. For example, as for braking control by the breaking ECU connected to the control-system network 23, because a vehicle running at 60 km/hr travels as far as 17 meters per second, braking operation is required to have a accuracy of a several-hundred millisecond unit, even at the minimal, and the similar time accuracy is required also for data acquired from the network. The control-system network 23, similarly as in the control-system network 22, is a network in accordance with standards such as CAN and Flex Ray.

To the safety-system network 24, there is connected an airbag 170, or a controller for controlling automatic winding-up of a seat belt in collision, although not described in FIG. 1, or the like. Equipments to be connected to the safety-system network 24 are all such equipments that operate so as to reduce human damage as much as possible, in the case where an accident such as collision is unavoidable. To the safety-system network 24, operation information when an equipment is operated, or trigger information for operation of an equipment when it is required to operate, flows in an event-driven way. The safety-system network 24, similarly as in the control-system network 22, is a network in accordance with standards such as CAN and Flex Ray.

To the in-vehicle gateway device 10, the information-system network 21, the control-system network 22, the control-system network 23 and the safety-system network 24 are connected to perform transfer of data among different networks.

As a first example of this data transfer between different networks, there is coalition between a car navigation device 110 on the information-system network 21 and a steering ECU 150 and a braking ECU 160 on the control-system network 23. In the car navigation device 110, a fact that a curve is approaching ahead can be recognized from map information and vehicle position information, and predicted travelling course. The car navigation device 110 transmits the curvature information of the curve ahead thus recognized to the steering ECU 150 and the braking ECU 160. Then, when the steering ECU 150 judges that a vehicle cannot turn the curve ahead safely under the present steering angle, it adds such control as to change the steering angle. In addition, when the braking ECU 160 judges that a vehicle cannot turn the curve ahead safely under the present vehicle speed, it performs such processing as to decelerate automatically to speed enabling to turn safely. This processing makes possible turn safely around the curve by performing automatic steering operation and deceleration, even in an over speed state and a driver does not notice the curve ahead.

As a second example, there is coalition between the braking ECU 150 on the control-system network 23, and the engine ECU 130 on the control-system network 22. The braking ECU has data of step depth of a brake to perform braking control, and transmits this data to an engine ECU 130. Then, the engine ECU 130 performs such control processing as to reduce opening degree of a throttle, in deceleration by stepping the brake to improve fuel economy. In this way, better gas mileage becomes possible as compared with performing control only by the engine ECU 130.

As a third example, there is coalition between the braking ECU 150 on the control-system network 23 and the car navigation device 110 on the information-system network 21. The braking ECU 150 transmits a rotation umber of a wheel obtained from information of a sensor installed for ABS, to the car navigation device 110. Then, the car navigation device calculates traveling distance from the rotation umber of a wheel, to be utilized in correction of present position.

As a fourth example, there is coalition between the braking ECU 150 on the control-system network 23 and the car navigation device 110 on the information-system network 21, and coalition with a DCM 120. The braking ECU 150 is capable of acquiring information on deterioration of a brake pad with a sensor installed at the brake pad, and transmits information on deterioration of the brake pad acquired, to the car navigation device 110 and the DCM 120. Then, the car navigation device 110 transmits information that replacement time is near, to a driver, as well as the DCM 120 transmits automatically information that replacement time of the brake pad is near, to a car dealer, by which parts replacement becomes possible in appropriate timing.

As a fifth example, there is cooperation between the airbag ECU 160 on the safety-system network 21 and the DCM 120 on the information-system network 21, and the engine ECU 120 on the control-system network 22 and a steering ECU 140 and the braking ECU 150 on the control-system network 23. When an airbag is operated, the airbag ECU 160 transmits this information of operation to the DCM 120, the engine ECU 120, the steering ECU 140 and the braking ECU 150. The DCM 120 transmits, to outside of vehicle, urgency message that an accident was generated, based on operation information of the airbag, so that help will come as quickly as possible. The engine ECU 130 stops engine operation, because of not knowing where failure is generated by the accident. The steering ECU 140 locks steering operation to prevent generation of secondary damage caused by movement of a vehicle in an unexpected direction after the accident. The braking ECU 150 performs braking operation automatically to prevent secondary damage caused by movement of a vehicle after the accident.

Figure 2:
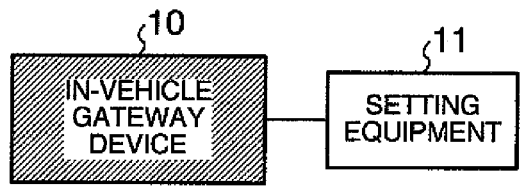
FIG. 2 is a drawing showing a configuration example of a vehicle system in setting an in-vehicle gateway device

FIG. 2 is a system configuration in the case of setting a routing method to the in-vehicle gateway device 10. This system is configured by the in-vehicle gateway device 10 and a setting equipment 11. The setting equipment 11 may be a general PC other than an exclusive terminal. The setting equipment 11 has function to input a device input/output data table 710, which is a list of input/output data of equipments to be set in a vehicle system, and function to transmit input data to the in-vehicle gateway device 10. In communication between the in-vehicle gateway device 10 and the setting equipment 11, standards such as serial communication, Ethernet (registered trademark) and IEEE 1394 are used.

Figure 3:
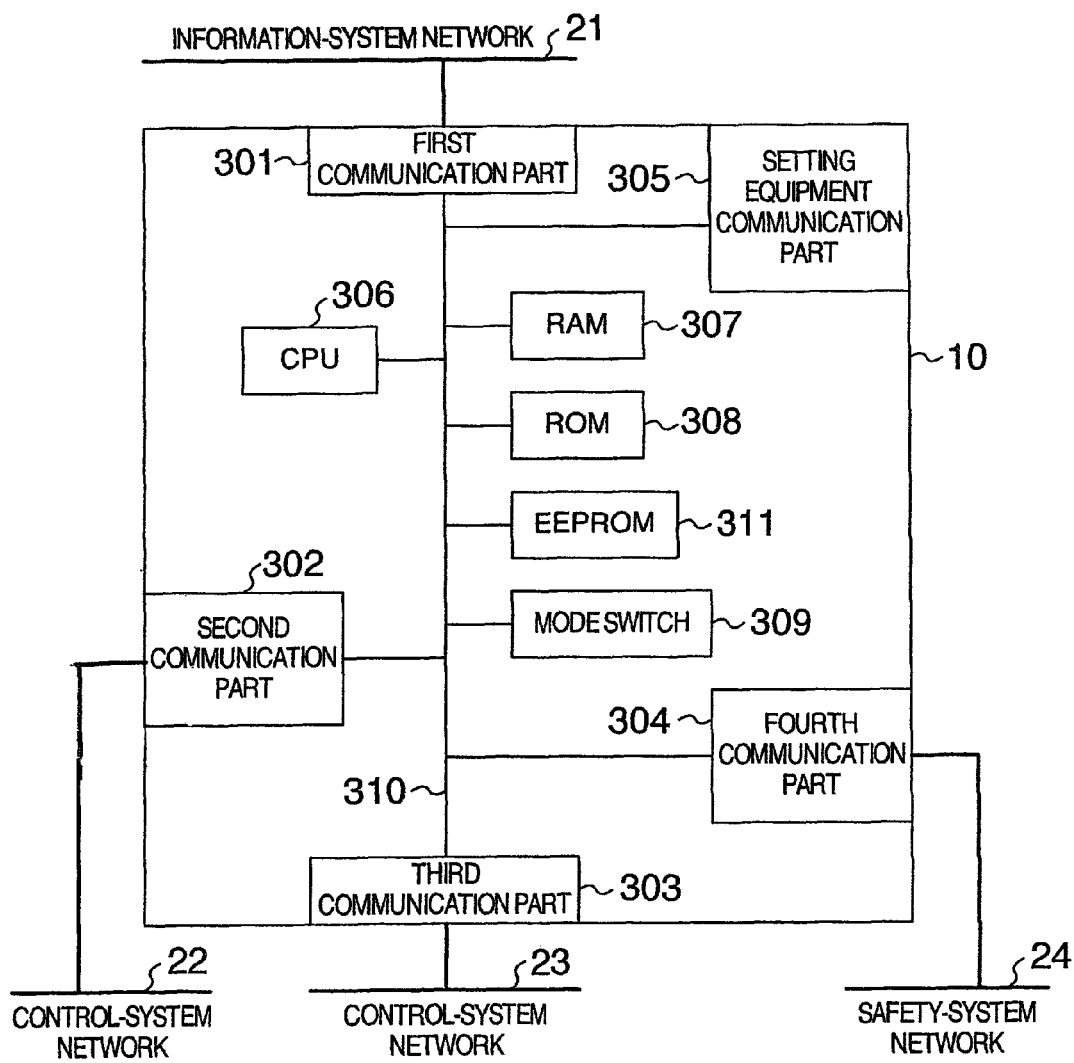
FIG. 3 is a drawing showing a hardware configuration of an in-vehicle gateway device.

FIG. 3 shows a hardware configuration of the in-vehicle gateway device 10 shown in FIG. 1. The in-vehicle gateway device 10 is configured by a first communication part 301, a second communication part 302, a third communication part 303, a fourth communication part 304 and a communication part 305 for setting equipment, as connection parts to exterior parts, and is a configuration having a CPU (Central Processing Unit) 306, which is a calculation device, and a RAM (Random Access Memory) 307, which is a volatile memory device, a ROM (Read Only Memory) 308, which is a non-volatile memory device for storing a program or data, an EEPROM (Electrically Erasable and Programmable Read Only Memory) 311 for storing the requiring rewriting, such as an initialization flag or setting information, a mode switch 309 for determining whether a setting mode or an operation mode, and an internal bus 310. The system configuration of FIG. 1 can be attained, as one example, by connecting the first communication part 301 with the information-system network 21, by connecting the second communication part 302 with the control-system network 22, by connecting the third communication part 303 with the control-system network 23, and by connecting the fourth communication part 304 with the safety-system network 24. In addition, in the system configuration of FIG. 2, the setting equipment communication part 305 and the setting equipment 11 are connected. The in-vehicle gateway device 10 has a program for setting and a program for operation, and a program for boot, and they are stored in the ROM 308. At the startup of the in-vehicle gateway device 10, the program for boot is started surely. Setting information set at a shipping stage of the in-vehicle gateway device 10 is also stored in the ROM 308. Table information set through the setting equipment 11, and table information set in initialization of the in-vehicle gateway device 10 are stored in the EEPROM 311.

Figure 4:
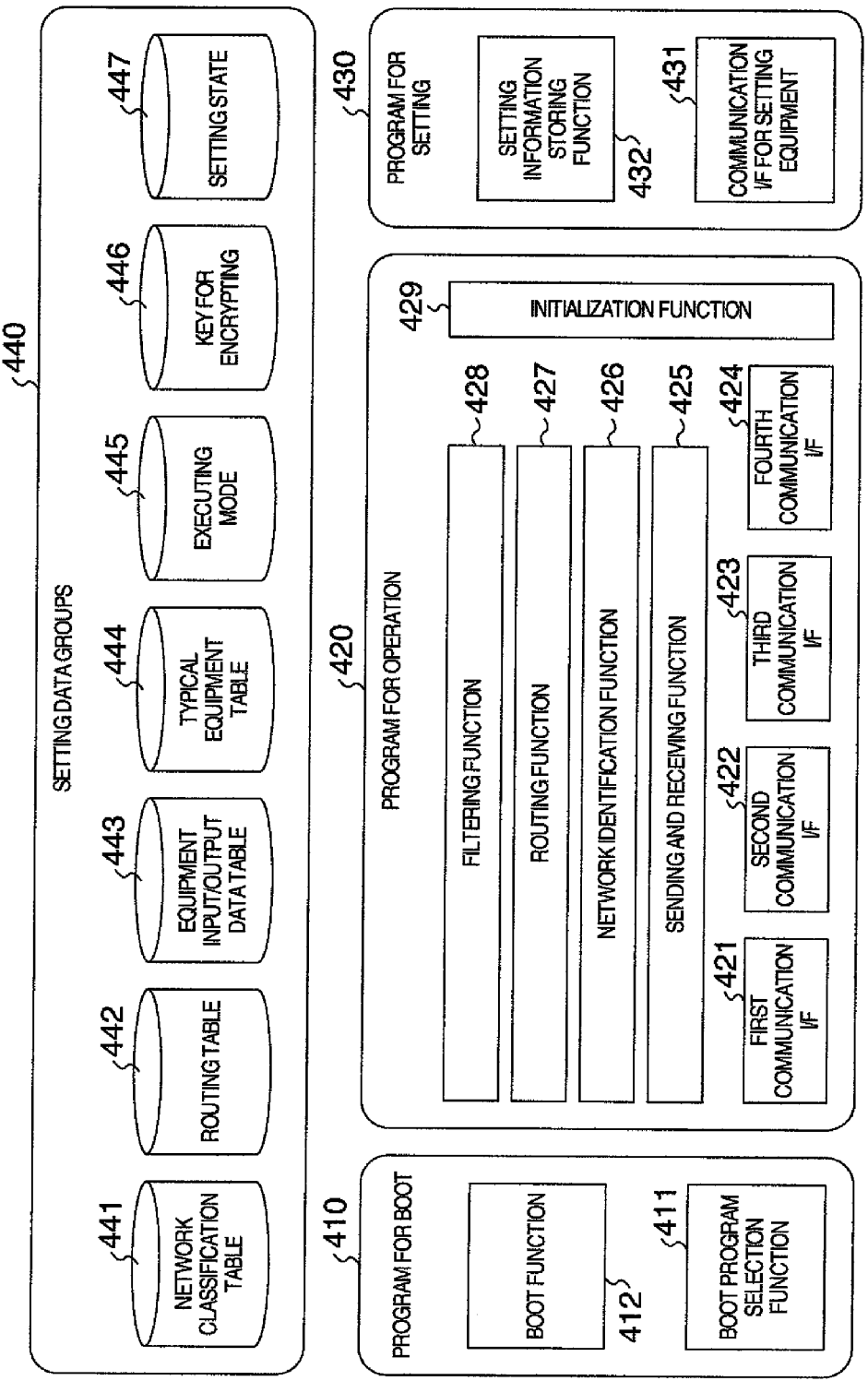
FIG. 4 is a drawing showing a software configuration of an in-vehicle gateway device.

FIG. 4 shows a software configuration of the in-vehicle gateway device 10. In the in-vehicle gateway device 10, there are three programs present, that is, a program for boot 410, a program for operation 420 and a program for setting 430, and a setting data group 440, which is refereed and modified from each program.

The program for boot 410 has function of boot program selection function 411 and boot function 412. The program for boot 410 is executed first surely, when the in-vehicle gateway device 10 is started. Boot program selection function 411 refers to data of an executing mode 445 of the setting data group 440 to select which of the program for operation 420 or the program for setting 430 should be started. Boot function 412 has function to perform a program selected by boot program selection function 411.

The program for operation 420 is configured by a first communication I/F (Inter Face) 421, a second communication I/F (Inter Face) 422, a third communication I/F (Interface) 423, a fourth communication I/F (Interface) 424, sending and receiving function 425, network identification function 426, routing function 427, filtering function 428 and initialization function 429. The first communication I/F 421 is driver function of the first communication part 301, the second communication I/F 422 is driver function of the second communication part 302, the third communication I/F 423 is driver function of the third communication part 303, and the fourth communication I/F 424 is driver function of the fourth communication part 304. Sending and receiving function 425 retains data together with information on "from which communication I/F the data comes", in receiving the data from the first to the fourth communication I/F, and gives direction so as to output to the communication I/F requiring the output, in receiving the data from network identification function 426. Network identification function 426 refers to a network classification table 441 of a setting data group 440 for input data, and judges that the data input from the communication I/F of an input origin is one input from which one of the information-system network, the control-system network and the safety-system network. Routing function 427 refers to a routing table 442 of the setting data group 440, and judges the communication I/F of an output destination from a data identifier of input data. Filtering function 428 performs filtering processing programmed in advance, in response to behavior of a network of an input origin and a network of an output destination for input data. Filtering by the in-vehicle gateway device 10 is performed under such policy that data is not output to the safety-system; data which is output from the safety-system has high urgency; data which is input from the information-system has lower priority than data which is input from other systems; and data which is input from the control-system has high confidentiality. Specifically, processing is performed so that in the case where an input origin and an output destination are the same, data is output as it is without performing special processing; in the case where an input origin is the information-system and an output destination is the control-system, data is output only when there is room, with confirming bus load of the control-system; in the case where an input origin is the information-system and an output destination is the safety-system, data output is stopped; in the case where an input origin is the control-system and an output destination is the information-system, encryption is performed; in the case where an input origin is the control-system and an output destination is the safety-system, data output is stopped; and in the case where an input origin is the safety-system, output is performed immediately to a network connected, without performing judgment of the output destination. Initialization function 429 is performed when a setting state 447 of the setting data group 440 shows "Initialization is necessary", and refers to an equipment input/output data table 443 and a typical equipment table 444 of the setting data group 440, and generates the network classification table 441 and the routing table 442.

The program for setting 430 is configured by a communication for setting equipment I/F 431 and the setting information storing function 432. The communication for setting equipment I/F 431 is driver function of the communication part for setting equipment 305. Setting information storing function 432 sets an equipment input/output data, which is input from the setting equipment 11 of outside through the communication for setting equipment I/F, to the equipment input/output data table 443 of the setting data group 440, and changes the setting state 447 to "initialization is necessary".

The setting data group 440 is configured by the network classification table 441 and the routing table 442, the equipment input/output data table 443, the typical equipment table 444, the executing mode 445, a key for encrypting 446, and the setting state 447. The network classification table 441 is information specifying which of the classification network among the information-system, the control-system and the safety-system does a network connected with the first communication part 301, the second communication part 302, the third communication part 303 and the fourth communication part 304 included in the in-vehicle gateway device 10 belong to, and is stored in the EEPROM 311, and is generated by initialization function 429 of the program for operation 420, and referred by network identification function 426 of the program for operation 420. The routing table 442 is information which sets, by each data identifier to be input, "data which is input to the in-vehicle gateway device 10 should be input from which communication parts in the first communication part 301, the second communication part 302, the third communication part 303, and the fourth communication part 304, and should be output to which communication parts", and is stored in the EEPROM 311, generated by initialization function 429 of the program for operation 420, and referred by routing function 427 of the program for operation 420. It should be noted that, as for a data identifier, there should be no presence of duplication of data with different kind in the same vehicle system. In the equipment input/output data table 443, data identifiers for all devices present on a network configuring a vehicle system, and input to and output from the network, are set by each device, and stored in the EEPROM 311, generated by setting information storing function 432 of the program for setting 430, and referred by initialization function 429 of the program for operation 420. The typical equipment table 444 is one showing equipments connected typically to networks of each classification of all systems of the information-system, the control-system and the safety-system, stored in the ROM 308, generated in a production stage of the in-vehicle gateway device 10, not modified afterwards, and referred by initialization function 429 of the program for operation 420. The executing mode 445 is set to determine which of the program for operation 420 and the program for setting 430 should be performed, and is set physically using a mode switch. Change of setting is performed by an operator, and is referred each time in startup of the in-vehicle gateway device 10, by boot program selection function 411 of the program for boot 410. The key for encrypting 446 is a set of a public key and a secrete key for performing encryption for data, in transmitting data from the control-system network to the information-system network, and stored in the ROM 308. The public key is generated at a production stage of the in-vehicle gateway device 10 and referred by initialization function 429 of the program for operation 420, while the secrete key is referred by filtering function 428 of the program for operation 420. The setting state 447 performs initialization function 429 of the program for operation 420, and shows whether update of setting of the network classification table 441 and the routing table 442 is necessary or not, has value showing any one of "Initialization is necessary" and "Initialization is not necessary", and is stored in the EEPROM 311. The setting state 447 is referred surely in startup of the program for operation 420, sets "Initialization is necessary" when change of the equipment input/output data table 443 is performed by setting information storing function 432 of the program for setting 430, and sets "Initialization is not necessary" in performing initialization function 429 of the program for operation 420.

Figure 5:
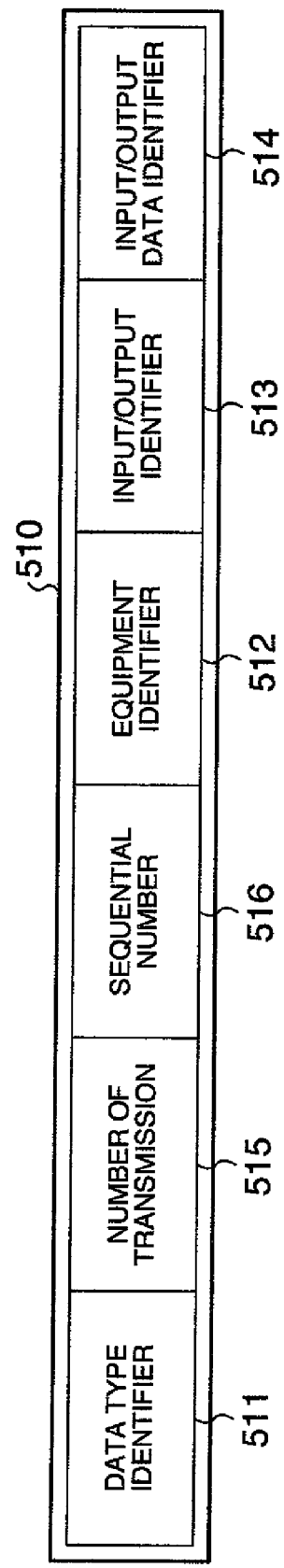
FIG. 5 is a drawing showing a data format in communication between an in-vehicle gateway device and a setting equipment.

FIG. 5 shows setting change data 510, and as shown in FIG. 2, in the case where the in-vehicle gateway device 10 and the setting equipment 11 are connected by the setting equipment communication part 305, shows a data format in transmitting data for changing the equipment input/output data table 443, from the setting equipment 11 to the in-vehicle gateway device 10. Setting change data 510 is configured by a data type identifier 511, a transmission number 515, a sequential number 516, a device identifier 512, an input/output identifier 513 and an input/output data identifier 514. The data type identifier 511 has value of any one of an identifier "#200" showing that an equipment input/output data set in the past is deleted, and an identifier "#100" showing that setting change data 510 to be transmitted is data to be added to the equipment input/output data. The transmission number 515 shows how many data are transmitted in total. The sequential number 516 shows what number of data it is among all data to be transmitted. The equipment identifier 512 shows an equipment identifier to be registered in the equipment input/output data table 443. An input/output identifier 513 is an identifier showing which one of input data or output data it is, for an equipment shown by the equipment identifier 512, and sets "0" for an input and "1" for an output. An input/output data identifier 514 sets an identifier of input/output data to an equipment shown by the equipment identifier 512. Setting change data 510 is necessary to set by one for each of input/output data, in the case where a plurality of input/output data are present for one equipment.

Figure 6:
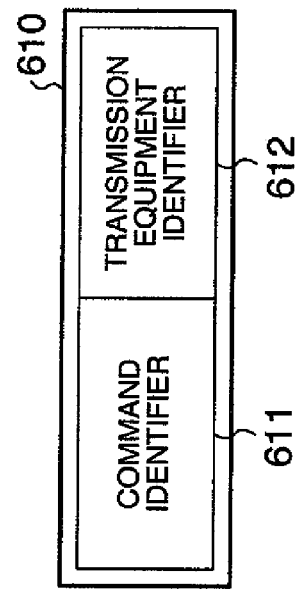
FIG. 6 is a drawing showing a data format in communication for initialization between an in-vehicle gateway device and an equipment in a vehicle system.

FIG. 6 shows communication data for initialization 610, and as shown in FIG. 1, in the case where the in-vehicle gateway device 10 was connected to a network of a vehicle system and in performing initialization function 429 of the program for operation 420, shows a data format to be used in exchange between the in-vehicle gateway device 10 and an equipment on a network. Communication data for initialization 610 is configured by a command identifier 611 and a transmission equipment identifier 612. The command identifier 611 shows what kind of data communication data for initialization 610 is, and the case where the command identifier 611 is "#100" shows inquiry of a connection equipment, which is transmitted from the in-vehicle gateway device 10 to an equipment on a network connected; and the case where the command identifier 611 is "#110" shows that it is data for transmitting an equipment identifier of an equipment to be transmitted from an equipment on a network connecting to the in-vehicle gateway device 10; and the case where the command identifier 611 is "#300" shows that it is data to request transmission of data for a test from the in-vehicle gateway device 10 to an equipment on a network connected. The transmission equipment identifier 612 is data for showing an equipment to which communication data for initialization 610 was transmitted, and an equipment identifier of an equipment transmitted is set.

FIG. 7 shows the equipment input/output data table 710, representing data stored in the equipment input/output data table 443 of the setting data group 440. The equipment input/output data table 710 is generated by the equipment input/output data table 443 of the program for setting 430, according to content transmitted from the setting equipment 11, when the executing mode 445 is set for the program for setting 430. In addition, the equipment input/output data table 710 sets the executing mode 445 for the program for operation 420, and when the setting state 447 shows "Initialization is necessary", is referred by initialization function 429 of the program for operation 420 to generate the routing table 442. The equipment input/output data table 710 is configured by an equipment identifier 711, an input data identifier 712 and an output data identifier 713. The equipment identifier 711 is an identifier to be used for differentiating an equipment connected to a network in a vehicle system, and has no duplication in the same vehicle system. The input data identifier 712 is an identifier of data to be input to an equipment set by the equipment identifier 711, via a network. Identifier of this data shows kind of data, and there is no different data having the same identifier. The output data identifier 713 shows an identifier of data which is output to a network from an equipment set by the equipment identifier 711. In an example of FIG. 7, it is shown that a car navigation device of an equipment identifier #110 outputs curvature of a curve ahead, of the data identifier #111, inputs wheel rotation number of a data identifier #152 to position correction, inputs updated map information of a data identifier #121 to update the map, and inputs information on brake pad deterioration of a data identifier #153 for a notice to a driver. The DCM of the equipment identifier #120 outputs updated map information of the data identifier #121, inputs airbag operation information of a data identifier #161 for an urgency message of an accident, and inputs information on brake pad deterioration of the data identifier #153 for a notice to a dealer. The engine ECU of an equipment identifier #130 shows to input airbag operation information of the data identifier #161 to stop an engine in emergency, and to input brake step depth of a data identifier #151 to adjust opening degree of a throttle. The steering ECU of an equipment identifier #140 shows to input airbag operation information of the data identifier #161 to lock operation of a steering in emergency, and input curvature of curve ahead, of the data identifier #111, in order to attain smooth curve travelling by automatic steering operation. The braking ECU of an equipment identifier #150 shows to output brake step depth of the data identifier #151, output wheel rotation number of the data identifier #152, output information on brake pad deterioration of the data identifier #153, input airbag operation information of the data identifier #161 to perform braking operation in emergency, and input curvature of a curve ahead, of the data identifier #111 to automatically operate deceleration processing to surely turn the curve. The airbag ECU of an equipment identifier #160 shows to output airbag operation information of the data identifier #161.

FIG. 8 shows a typical equipment table 810, representing data stored in the typical equipment table 444 of the setting data group 440. The typical equipment table 810 is set when the in-vehicle gateway device 10 is produced. The typical equipment table 810 sets the executing mode 445 for the program for operation 420, and referred by initialization function 429 of the program for operation 420 to generate the network classification table 441, when the setting state 447 shows "Initialization is necessary". The typical equipment table 810 is configured by a network classification 811 and a typical equipment identifier 812. In the network classification 811, any one of the information-system, control-system or safety-system, which is a classification of a network, is set. A typical equipment identifier 812 shows an equipment identifier of an equipment connected typically to a network of a classification set by the network classification 811. In an example of FIG. 8, it is shown that, the equipment identifier #110 showing a car navigation device is set as an equipment identifier of a typical equipment of the information-system network; the equipment identifier #130 showing the engine ECU and an equipment identifier #150 showing the braking ECU are set as an equipment identifier of a typical equipment of the control-system network; and the equipment identifier #160 showing the airbag ECU is set as an equipment identifier of a typical equipment of the safety-system network.

FIG. 9 shows a routing table 910, representing data stored in the routing table 442 of the setting data group 440. The routing table 442 is set for the executing mode 445 for the program for operation 420, and when the setting state 447 shows "Initialization is necessary", it is generated by initialization function 429 of the program for operation 420, and when the executing mode 445 is set for the program for operation 420, it is referred to determine an output destination of data which is input from routing function 427 of the program for operation 420. The routing table 910 is configured by an input data identifier 911, an input I/F 912 and an output I/F 913. The input data identifier 911 shows a data identifier of data which is input to the in-vehicle gateway device 10; and the input I/F 912 shows that data, which is set by the input data identifier 911, is input from which of the communication I/F of the in-vehicle gateway device 10; and the output I/F 913 shows that the communication I/F of the in-vehicle gateway device 10 connected with a network having an equipment requiring data, which is set by the input data identifier 911, is which of the communication I/F. In an example of FIG. 9, it is shown that, because curvature of a curve ahead of the data identifier of #111, which is output from the car navigation device 110 connected to the information-system network 21, is utilized for automatic steering operation and automatic deceleration, in order to turn safely the curve by the steering ECU 140 and the braking ECU 150 connected to the control-system network 23, in the in-vehicle gateway device 10, a routing is set so as to input from the first communication I/F and output to the third communication I/F. It is shown that, because step depth of a brake of the data identifier #151, which is output from the braking ECU 150 connected to the control-system network 23, is utilized to adjust opening degree of an engine throttle in response to deceleration of braking operation, by the engine ECU 130 connected to the control-system network 22, in the in-vehicle gateway device 10, a routing is set so as to input from the third communication I/F and output to the second communication I/F. It is shown that, because wheel rotation number having the data identifier of #152, which is output from the braking ECU 150 connected to the control-system network 23, is utilized to perform correction of position by the in-vehicle gateway device 10 connected to the information-system network 21, a data identifier, which is output from the braking ECU 150 connected to the control-system network 23, in the in-vehicle gateway device 10, a routing is set so as to input from the third communication I/F and output to the first communication I/F. It is shown that, because information on deterioration of a brake pad having the data identifier of #153, which is output from the braking ECU 150 connected to the control-system network 23, is utilized to notice, to a driver, that replacement time has come, by the car navigation device 110 connected to the information-system network 21, and to notice, to a dealer, that replacement time has come, by the DCM 120 connected to the information-system network 21, in the in-vehicle gateway device 10, a routing is set so as to input from the third communication I/F and output to the first communication I/F. It is shown that, because airbag operation information having the data identifier of #161, which is output from the airbag ECU 160 connected to the safety-system network 24, is utilized to transfer urgency message of an accident to outside of a vehicle, by the DCM 120 connected to the information-system network 21, and to perform emergency engine stop, by the engine ECU 120 connected to the control-system network 22, and to lock steering operation by the steering ECU 130 connected to the control-system network 23, and to perform breaking operation by the braking ECU 140 connected to the control-system network 23, in the in-vehicle gateway device 10, a routing is set so as to input from the fourth communication I/F and output to the first communication I/F, the second communication I/F and the third communication I/F.

FIG. 10 shows a network classification table 1010, representing data stored in the network classification table 441 of the setting data group 440. In the network classification table 1010, the executing mode 445 is set for the program for operation 420, and when the setting state 447 shows "Initialization is necessary", is generated by initialization function 429 of the program for operation 420, and when the executing mode 445 is set for the program for operation 420, judges classification of an input origin network, based on an input origin communication I/F of data which is input by network identification function 426 of the program for operation 420, and is referred to judge classification of an output destination network, based on an output destination communication I/F of input data. The network classification table 1010 is configured by the communication I/F 1011 and the network classification 1012. The communication I/F 1011 shows a communication I/F of the in-vehicle gateway device 10, and the network classification 1012 shows that a network connecting to the communication I/F of the in-vehicle gateway device 10, which is set by the communication I/F 1011, corresponds to classification of which of the information-system, the control-system and the safety-system. In an example of FIG. 10, it is shown that a network connecting to the first communication I/F is the information-system, a network connecting to the second communication I/F is the control-system, a network connecting to the third communication I/F is the control-system, and a network connecting to the fourth communication I/F is the safety-system.

FIG. 11 shows a processing flow in startup of the in-vehicle gateway device 10. The in-vehicle gateway device 10, when started, firstly starts the program for boot 410 stored in the ROM 308 (1101). The program for boot 410 refers to the executing mode 445, which is set physically by the mode switch 309, by boot program selection function 411, to select boot program (1102). The program for boot 410 starts the program for setting 430 stored in the ROM 308, and terminates itself, in the case where setting in the executing mode 445 is the program for setting 430 by boot function 412 (1103). After that, the program for setting 430 is executed by the in-vehicle gateway device 10 (1104). In the case where setting of the executing mode 445 is the program for operation 420, as a result of the processing 1102, boot function 412 of the program for boot 410 starts the program for operation 420 stored in the ROM 308, and terminates itself (1105). After that the program for operation 420 is executed by the in-vehicle gateway device 10 (1106). By such processing, the in-vehicle gateway device 10 executes the program for setting 430 or the program for operation 420, in response to setting by the mode switch 309 by each startup.

FIG. 12 shows a setting processing flow of equipment input/output data to the in-vehicle gateway device 10, by a setting operator. The setting operator first sets the mode switch 309 of the in-vehicle gateway device 10 for setting (1201). Then, a power source of the in-vehicle gateway device 10 is put on (1202). When startup of the in-vehicle gateway device 10 is completed, the setting equipment 11 is connected to the setting equipment communication part 305 of the in-vehicle gateway device 10, as shown in FIG. 2 (1203). The setting operator prepares a similar one as the equipment input/output data table 710 on the setting equipment 11, and transmits it to the in-vehicle gateway device 10. When the setting operator performs transmission processing, data is transmitted to the in-vehicle gateway device 10 according to the data format of 510 from the setting equipment 11 (1204). When transmission is completed, the setting operator detaches the setting equipment 11 from the in-vehicle gateway device 10 (1205). Then, the power source of the in-vehicle gateway device 10 is off (1206). At this timing, the mode switch 309 of the in-vehicle gateway device 10 is set for use in operation (1207), and the in-vehicle gateway device 10 is set in a network of a vehicle system (1208), as shown in FIG. 1. This completes setting work by the setting operator.

Figure 13:
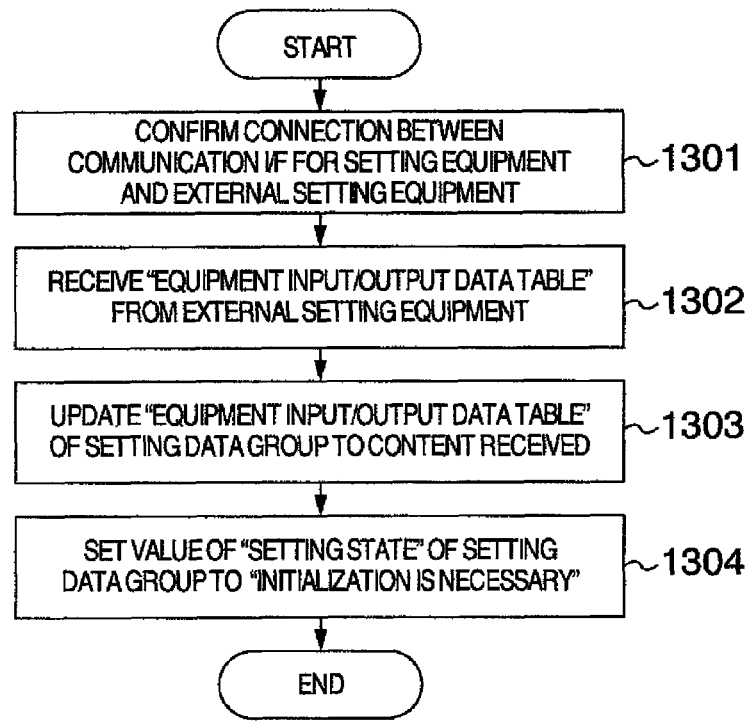
FIG. 13 is a drawing showing a processing flow of a program for setting of an in-vehicle gateway device.

FIG. 13 shows a processing flow of the program for setting 430, when the in-vehicle gateway device 10 is set and setting information is received from the setting equipment 11. The program for setting 430 is executed by a program for boot, according to the processing flow of FIG. 11, when the in-vehicle gateway device 10 is started in a state that the executing mode 445 is set for setting. The program for setting 430, when performed, first, confirms connection between the setting equipment communication I/F and the external setting equipment (1301). Updated content of the equipment input/output data table is received from the setting equipment 11. A format of data to be received is set to the format of FIG. 5, and reception is continued till values of the sequential number 516 and the transmission number 515 become the same (1302). Processing is performed one by one in the order of the sequential number 516 of data received. When a data type identifier of data received is #200, content of the equipment input/output data table 443 is deleted completely, while the data type identifier is #100, content of the relevant data is added to the equipment input/output data table 443 (1303). When updating by data received is all completed, the program for setting 430 sets the setting state 447 to "Initialization is necessary" (1304). Program for setting is over here.

Figure 14:
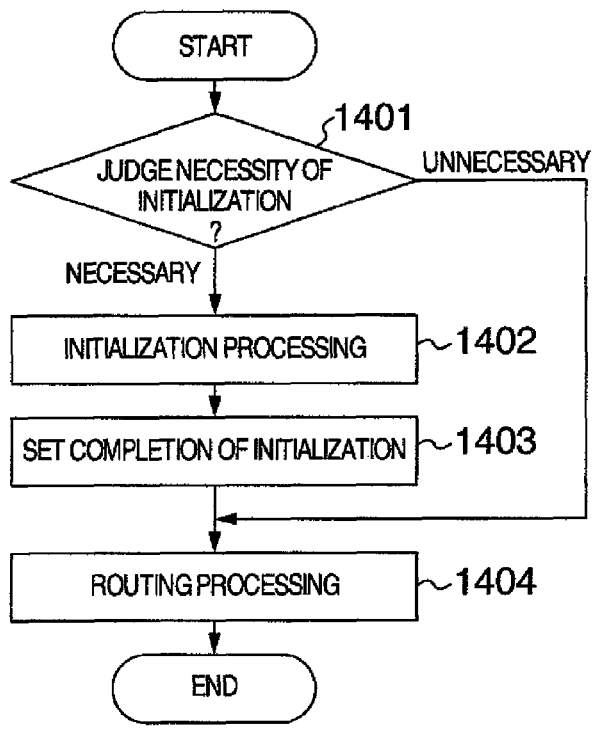
FIG. 14 is a drawing showing a processing flow of a program for operating of an in-vehicle gateway device.

FIG. 14 shows a processing flow of the program for operation 420 of the in-vehicle gateway device 10. The program for operation 420 is operated by the program for boot, according to the processing flow of FIG. 11, when the in-vehicle gateway device 10 is started in a state that the executing mode 445 is set for operation. When it is performed, the program for operation 420 firstly judges necessity of initialization, based on value of the setting state 447 (1407). In the case where the setting state, 447 was set to "Initialization is necessary", initialization processing is performed by initialization function 429 (1402). After completion of the initialization processing, value of the setting state 447 is set to "Initialization is not necessary" (1403). After completion of the initialization, routing processing is performed for data, which is input from a connected network, based on initialized data (1404). In the case where the setting state 447 was set to "Initialization is not necessary", settings of the initialization processing of the processing 1402 and initialization processing completion of the processing 1403 are skipped to start routine processing immediately (1404). Explanation will be given in detail on the initialization processing (1402) in FIG. 15, and on the routing processing (1404) in FIG. 16.

Figure 15A:
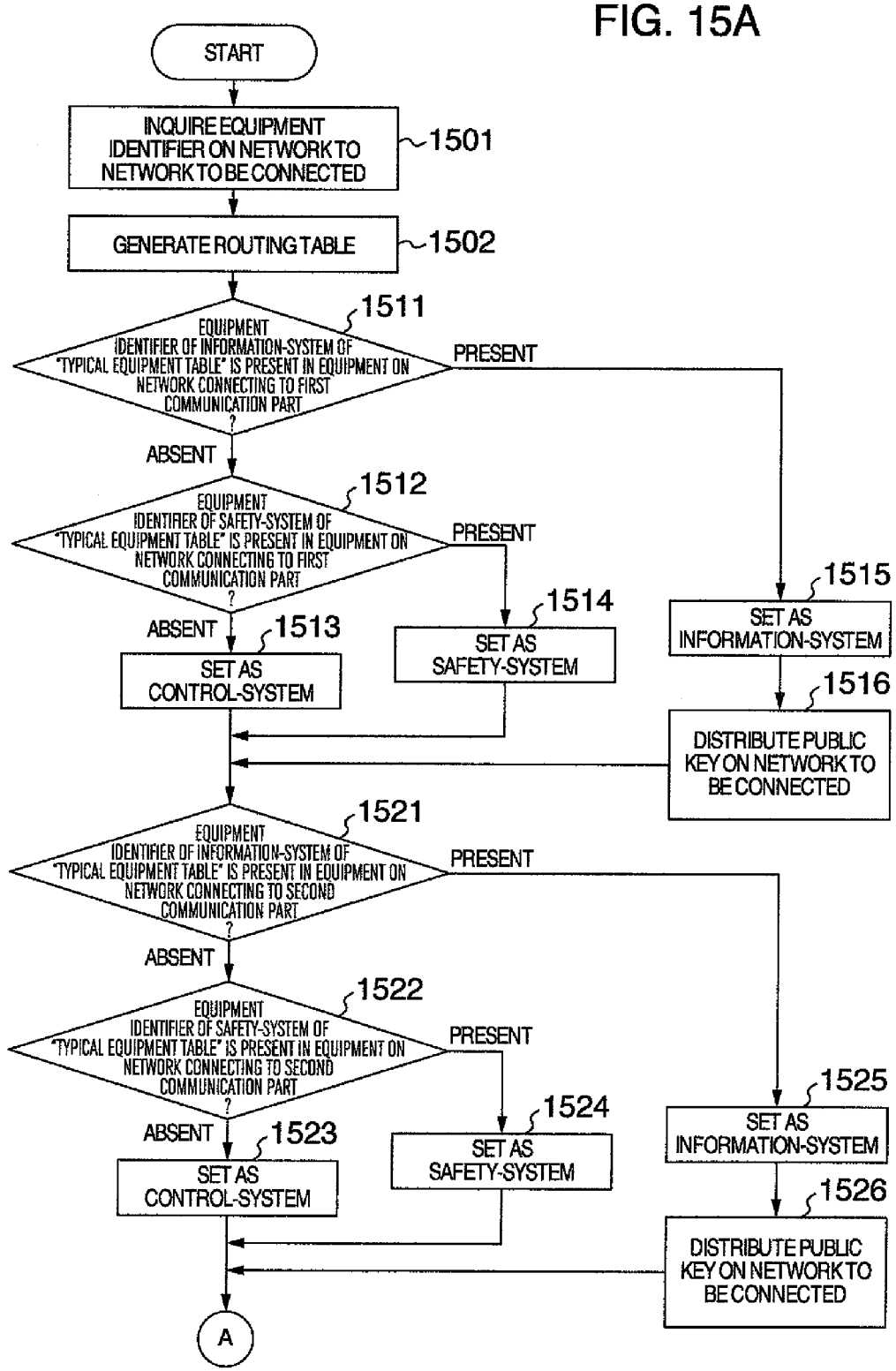
FIGS. 15A and 15B are drawings showing an initialization processing flow of a program for operating of an in-vehicle gateway device.
Figure 15B:
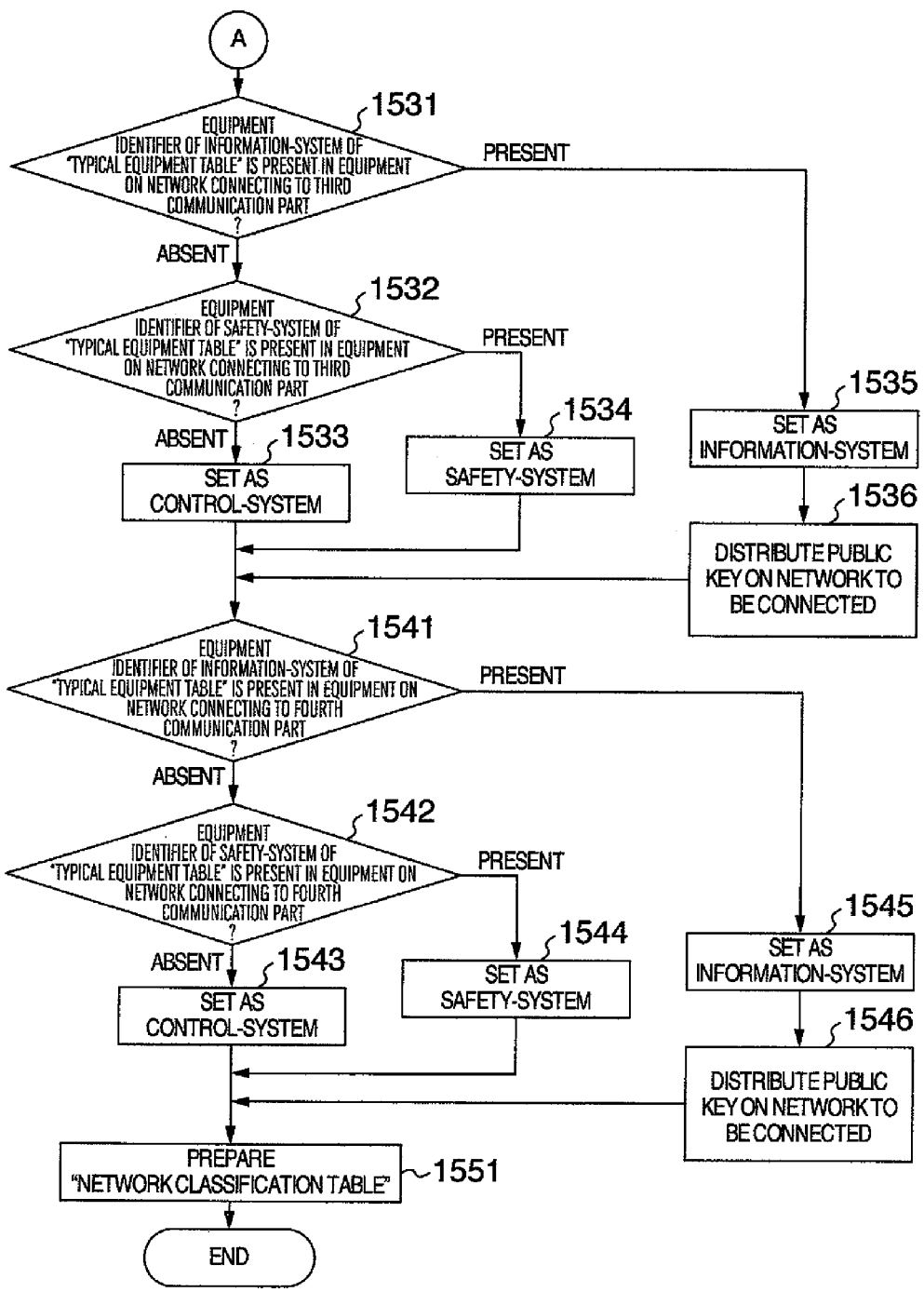

FIG. 15 shows a processing flow of an initialization processing 1402 by initialization function 429 in the program for operation 420 of the in-vehicle gateway device 10.

The program for operation 420 inquires an equipment identifier connecting to a network, for the network connecting to the in-vehicle gateway device 10. A message of the inquiry obeys the format of FIG. 6, sets "#100" to the command identifier 611 of communication data for initialization 610, and transmits data set, where an equipment identifier "#10" showing the in-vehicle gateway device 10 is set, to the transmission equipment identifier 612. On the other hand, in the system configuration as in FIG. 1, to the first communication part 301, there are input data transmitted from the car navigation device 110, where the command identifier 611 is "#110" and the transmission equipment identifier 612 is "#110", and data transmitted from the DCM 120, where the command identifier 611 is "#110" and the transmission equipment identifier 612 is "#120". To the second communication part 302, there is input data transmitted from the engine ECU 130, where the command identifier 611 is "#110" and the transmission equipment identifier 612 is "#130". To the third communication part 303, there are input data transmitted from the steering ECU 140, where the command identifier 611 is "#110" and the transmission equipment identifier 612 is "#140", and data transmitted from the braking ECU 150, where the command identifier 611 is "#110" and the transmission equipment identifier 612 is "#150". To the fourth communication part 304, there is input data transmitted from the airbag ECU 160, where the command identifier 611 is "#110" and the transmission equipment identifier 612 is "#160" (1501). In initialization function 429, the routing table 442 is prepared, based on such input data and the equipment input/output data table 443 (1502). A preparation flow will be shown below in the case of having the system configuration of FIG. 1 and the equipment input/output data table 710 of FIG. 7.

In the first communication part 301, input data of the equipment identifier #110 and #120 is received. When a line, where the equipment identifier 711 is #110 and #120, is searched by the equipment input/output data table 710, it is clarified that in the line, where the equipment identifier 711 is #110, the input data identifier 712 is #121, #152 and #153, while in the line, where the equipment identifier 711 is #120, the input data identifier 712 is #153 and #161. When they are put together, data required to be input to an equipment on a network connecting to the first communication part 301, are four data of identifier of #121, #152, #153 and #161. On the other hand, in the equipment input/output data table 710, a line with the output data identifier 713 of #121 has the equipment identifier 711 of #120; a line with the output data identifier 713 of #152 has the equipment identifier 711 of #150; a line with the output data identifier 713 of #153 has the equipment identifier 711 of #150; and a line with the output data identifier 713 of #161 has the equipment identifier 711 of #160. It is understood to be necessary that, because among data input to each communication part, data with the equipment identifier of #120, shown by the transmission identifier 612 is from the first communication part 301; data with an equipment identifier of #150 is from the third communication part 303; and data with an equipment identifier of #160 is from the fourth communication part 304; as a routing processing, data with the data identifier of #152 and #153, which is input from the third communication part 303, should be output to the first communication part 301, and data with the data identifier of #161, which is input from the fourth communication part 304, should be output to the first communication part 301.

In the second communication part 302, input data of the equipment identifier #130 is received. When a line, where the equipment identifier 711 is #130, is searched by the equipment input/output data table 710, it is clarified that in the line, where the equipment identifier 711 is #130, the input data identifier 712 is #151 and #161. On the other hand, in the equipment input/output data table 710, a line with the output data identifier 713 of #151 has the equipment identifier 711 of #150; and a line with the output data identifier 713 of #161 has the equipment identifier 711 of #160. It is understood to be necessary that, because among data input to each communication part, data with the equipment identifier of #150, shown by the transmission equipment identifier 612 is from the third communication part 303; and data with an equipment identifier of #160 is from the fourth communication part 304; as a routing processing, data with the data identifier of #151, which is input from the third communication part, should be output to the second communication part 302, and data with the data identifier of #161, which is input from the fourth communication part 304, should be output to the second communication part 302.

In the third communication part 303, input data of the equipment identifier #140 and #150 are received. When a line, where the equipment identifier 711 is #140 and #150, is searched by the equipment input/output data table 710, it is clarified that in the line, where the equipment identifier 711 is #140, the input data identifier 712 is #111 and #161. When they are put together, data required to be input to an equipment on a network connecting to the third communication part 303, are two having the data identifier of #111 and #161. On the other hand, in the equipment input/output data table 710, a line with the output data identifier 713 of #111 has the equipment identifier 711 of #110; and a line with the output data identifier 713 of #161 has the equipment identifier 711 of #160. It is understood to be necessary that, because among data input to each communication part, data with the equipment identifier of #110, shown by the transmission equipment identifier 612 is from the first communication part 301; and data with an equipment identifier of #160 is from the fourth communication part 304; as a routing processing, data with the data identifier of #111, which is input from the first communication part 301, should be output to the third communication part 303, and data with the data identifier of #161, which is input from the fourth communication part 304, should be output to the third communication part 303.

In the fourth communication part 304, input data of the equipment identifier #160 is received. When a line, where the equipment identifier 711 is #160, is searched by the equipment input/output data table 710, it is clarified that in the line, where the equipment identifier 711 is #160, input data necessary is absent. Therefore, it is understood that there is no data which should be output to the fourth communication part 304.

Summary of the above, by each data identifier, gives the routing table 910 of FIG. 9.

Initialization function 429 compares presence or absence of an equipment identifier, which is set in the typical equipment identifier 812 of an item, where the network classification 811 corresponds to the information-system, in setting of the typical equipment table 444, in the equipment identifier, which is input from a network connecting to the first communication part 301 (1511). In the case where it is present, the network connecting to the first communication part 301 is judged as the information-system network (1515), and a public key existing in the key for encrypting 446 is distributed for the network connecting to the first communication part 301 (1516). In the case where the equipment identifier, which was set in the typical equipment identifier 812 of the information-system network, is not present, comparison is made on presence or not of an equipment identifier, which is set in the typical equipment identifier 812 of an item, where the network classification 811 corresponds to the safety-system (1512). In the case where it is present, the network connecting to the first communication part 301 is judged as the safety-system network (1514), and in the case of absence, the network connecting to the first communication part 301 is judged as the control-system network (1513). In the system configuration of FIG. 1, input data of the equipment identifier #110 and #120 is received by the first communication part 301. On the other hand, in the typical equipment table 810, because, in the network classification 811, the typical equipment identifier 812 of a line of the information-system is #110, presence of the information-system equipment is understood (1511), and the network connecting to the first communication part 301 is judged as the information-system network (1515). Because of judgment as the information-system, a public key of the key for encrypting 446 is output for the network connecting to the first communication part 301 (1516).

Initialization function 429 compares presence or absence of an equipment identifier, which is set in the typical equipment identifier 812 of an item, where the network classification 811 corresponds to the information-system, in setting of the typical equipment table 444, in the equipment identifier, which is input from a network connecting to the first communication part 302 (1521). In the case where it is present, the network connecting to the second communication part 302 is judged as the information-system network (1525), and a public key existing in the key for encrypting 446 is distributed for the network connecting to the second communication part 302, (1526). In the case where the equipment identifier, which was set in the typical equipment identifier 812 of the information-system network, is not present, comparison is made on presence or not of an equipment identifier, which is set in the typical equipment identifier 812 of an item, where the network classification 811 corresponds to the safety-system (1522). In the case where it is present, the network connecting to the second communication part 302 is judged as the safety-system network (1524), and in the case of absence, the network connecting to the second communication part 302 is judged as the control-system network (1523). In the system configuration of FIG. 1, input data of the equipment identifier 4130 is received by the second communication part 302. On the other hand, in the typical equipment table 810, because, in the network classification 811, the typical equipment identifier 812 of a line of the information-system is #110, absence of the information-system equipment is understood (1521). In the typical equipment table 810, because, in the network classification 811, the typical equipment identifier 812 of a line of the information-system is #160, also absence of the safety-system equipment is understood (1522). Therefore the network connecting to the second communication part 302 is judged as the control-system network (1525).

Initialization function 429 compares presence or absence of an equipment identifier, which is set in the typical equipment identifier 812 of an item, where the network classification 811 corresponds to the information-system, in setting of the typical equipment table 444, in the equipment identifier, which is input from a network connecting to the third communication part 303 (1531). In the case where it is present, the network connecting to the third communication part 303 is judged as the information-system network (1535), and a public key existing in the key for encrypting 446 is distributed for the network connecting to the third communication part 303, (1536). In the case where the equipment identifier, which was set in the typical equipment identifier 812 of the information-system network, is not present, comparison is made on presence or not of an equipment identifier, which is set in the typical equipment identifier 812 of an item, where the network classification 811 corresponds to the safety-system (1532). In the case where it is present, the network connecting to the third communication part 303 is judged as the safety-system network (1534), and in the case of absence, the network connecting to the third communication part 303 is judged as the control-system network (1533). In the system configuration of FIG. 1, input data of the equipment identifier #140 and #150 are received by the third communication part 303. On the other hand, in the typical equipment table 810, because, in the network classification 811, the typical equipment identifier 812 of a line of the information-system is #110, absence of the information-system equipment is understood (1531). In the typical equipment table 810, because, in the network classification 811, the typical equipment identifier 812 of a line of the safety-system is #160, also absence of the safety-system equipment is understood (1532). Therefore the network connecting to the third communication part 303 is judged as the control-system network (1535).

Initialization function 429 compares presence or absence of an equipment identifier, which is set in the typical equipment identifier 812 of an item, where the network classification 811 corresponds to the information-system, in setting of the typical equipment table 444, in the equipment identifier, which is input from a network connecting to the fourth communication part 303 (1541). In the case where it is present, the network connecting to the fourth communication part 304 is judged as the information-system network (1545), and a public key existing in the key for encrypting 446 is distributed the network connecting to the fourth communication part 304, (1546). In the case where the equipment identifier, which was set in the typical equipment identifier 812 of the information-system network, is not present, comparison is made on presence or not of an equipment identifier, which is set in the typical equipment identifier 812 of an item, where the network classification 811 corresponds to the safety-system (1542). In the case where it is present, the network connecting to the fourth communication part 304 is judged as the safety-system network (1544), and in the case of absence, the network connecting to the fourth communication part 304 is judged as the control-system network (1543). In the system configuration of FIG. 1, input data of the equipment identifier #160 is received by the fourth communication part 304. On the other hand, in the typical equipment table 810, because, in the network classification 811, the typical equipment identifier 812 of a line of the information-system is #110, absence of the information-system equipment is understood (1541). In the typical equipment table 810, because, in the network classification 811, the typical equipment identifier 812 of a line of the safety-system is #160, presence of the safety-system equipment is understood (1532). Therefore the network connecting to the fourth communication part 304 is judged as the safety-system network (1545).

Initialization function 429 sets classification results of a network connecting to each communication part, obtained as the results of from the processing 1511 to the processing 1547, to the network classification table 441 (1551). In the case of system configuration of FIG. 1, a network connecting to the first communication part 301 is judged as the information-system network; a network connecting to the second communication part 302 is judged as the control-system network; a network connecting to the third communication part 303 is judged as the control-system network; and a network connecting to the forth communication part 304 is judged as the safety-system network, and because driver function for the first communication part 301 is the first communication I/F 421, driver function for the second communication part 302 is the second communication I/F 422, driver function for the third communication part 303 is the third communication I/F 423, and driver function for the fourth communication part 304 is the fourth communication I/F 424, such setting is performed that a network classification 1012 for the communication I/F 1011 to be the first communication I/F is the information-system network; the network classification 1012 for the communication I/F 1011 to be the second communication I/F is the control-system network; the network classification 1012 for the communication I/F 1011 to be the third communication I/F is the control-system network; and the network classification 1012 for the communication I/F 1011 to be the fourth communication I/F is the safety-system network, like the network classification table 1010 of FIG. 10.

Figure 16:
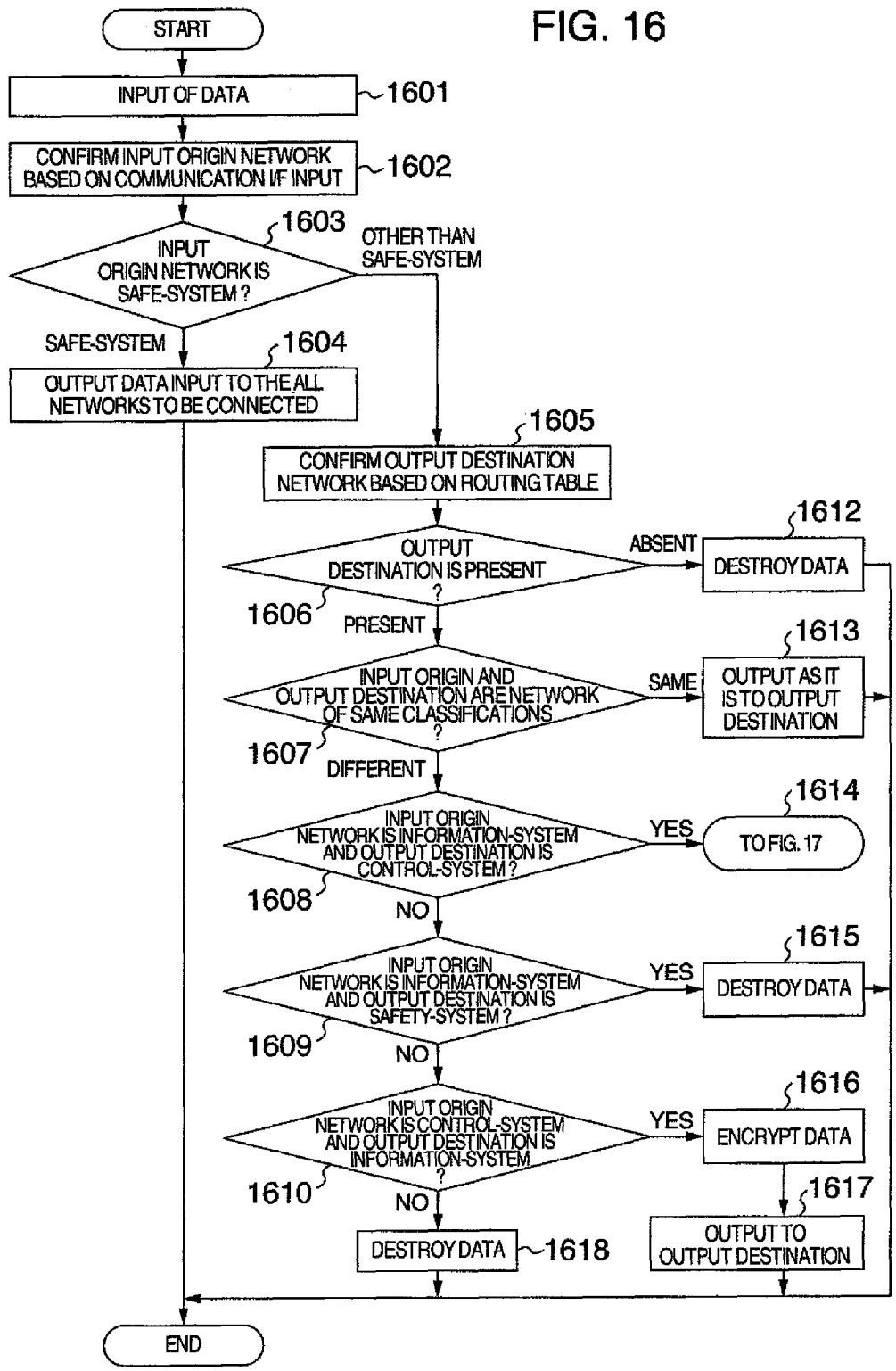
FIG. 16 is a drawing showing a routing processing flow of an in-vehicle gateway device.

FIG. 16 shows a processing flow of the routing processing in the program for operation 420 of the on-vehicle gateway equipment 10. The program for operation 420 receives input of data from a network connecting in sending and receiving function 425, via driver function of any of the first communication I/F 421, the second communication I/F 422, the third communication I/F 423, and the fourth communication I/F 424 (1601). Network identification function 426 confirms classification of a network of an input origin, using a communication I/F with which an input was received, and the network classification table 441 (1602). It is confirmed whether the network of an input origin is the safe-system network or not (1603), and in the case where it is the safety-system network, routing function 427 is not performed, and immediately input data is output to the all networks connecting to the in-vehicle gateway device 10, using sending and receiving function 425, and the processing is terminated (1604). In the case where the input origin network is not the safety-system network, the communication I/F of the output destination is confirmed using the routing table 442 by routing function 427 (1605). As a result of the processing 1605, routing function 427 confirms whether an output destination is present or not (1606). In the case where the output destination is absent, data is destroyed and the processing is terminated (1612). As a result of the processing 1605, in the case where the output destination is present, the processing is transferred to filtering function 428. Filtering function 428 confirms classification of a network corresponding to the communication I/F of the output destination, using the network classification table 441, and confirms whether the input origin and the output destination are networks of the same classification or not (1607). In the case where the input origin and the output destination are networks of the same classification, input data is output as it is using sending and receiving function 425, and the processing is terminated (1613). In the case where the input origin and the output destination are networks of different classifications, it is confirmed whether the input origin is the information-system, and the output destination is the control-system (1608). The case where the input origin is the information-system and the output destination is the control-system will be explained in FIG. 17 (1614). In the case where the input origin is not the information-system or the output destination is not the control-system, it is confirmed whether the input origin is the information-system and the output destination is the safety-system (1609). In the case where the input origin is the information-system and the output destination is the safety-system, filtering function 428 destroys input data and terminates the processing (1615). In the case where the input origin is not the information-system or the output destination is not the safety-system, it is confirmed whether the input origin is the control-system and the output destination is the information-system (1610). In the case where the input origin is the control-system and the output destination is the information-system, filtering function 428 performs encryption of input data using a secrete key of the key for encrypting 446 (1616), and outputs data to the network of the output destination using sending and receiving function 425 and terminates the processing (1617). In the case where the input origin is not the control-system or the output destination is not the information-system, filtering function 428 destroys input data and terminates the processing (1618).

FIG. 17 shows a processing flow in the case where an input origin network of input data is the information-system network in filtering function 428, and an output destination network is the control-system network, among processing flows of the routing processing in the program for operation 420 of the in-vehicle gateway device 10. Filtering function 428 confirms check sum of the input data (1701). In the case where error is present, filtering function 428 destroys input data and terminates the processing (1707). In the case where error is absence, load of the output destination network is confirmed (1702). Here, in the case where input data has a plurality of output destinations, and among these, a plurality of the control-system networks are present, loads of a plurality of the control-system networks are confirmed at the same time. As a result of the confirmation, in the case where network load of all the control-system networks of output destination is below 50%, input data is output to the output destination network by sending and receiving function 425 (1706). As a result of the confirmation, when there is the case having the network load of equal to or higher than 50%, in at least one network of all the control-system networks of output destination, it is waited for 30 milliseconds (1704) and confirmation of network load is performed again. When there is the case where network load of all the control-system networks of output destination becomes below 50%, till this procedure of waiting for 30 milliseconds and confirming load is repeated ten times, input data is output from sending and receiving function 425, and in the case where ten times are repeated without giving the case of below 50% (1703), filtering function 428 destroys input data and terminates the processing (1705).

In the configuration shown in FIG. 1, for example, in the case where airbag operation information, having the data identifier of #161, is transmitted from the airbag 160, in the in-vehicle gateway device 10, this information is input to sending and receiving function 425 via the fourth communication I/F 424. Because an input origin is the fourth communication I/F 424, network identification function 426 judges the classification of a network of the input origin as the safety-system, based on the network classification table 1010, and immediately outputs airbag operation information, having the data identifier of #161, which is input data, by sending and receiving function 425, to the information-system network 21, the control-system network 22, the control-system network 23 and the safety-system network 24, which are all the networks connecting to the in-vehicle gateway device 10. It should be noted that DCM 120 acquires data thus output in the information-system network 21, to perform urgency message of an accident to outside of a vehicle; while the engine ECU 130 acquires the data in the control-system network 22, to perform automatic engine stop; and in the control-system network 23, the steering ECU 140 and the braking ECU 150 acquire the data, to perform steering operation and automatic braking operation.

In the configuration shown in FIG. 1, for other example, in the case where wheel rotation number, having the data identifier of #152, is transmitted from the braking ECU 150, in the in-vehicle gateway device 10, this information is input to sending and receiving function 425 via the third communication I/F 423. Because an input origin is the third communication I/F 423, network identification function 426 judges the classification of a network of the input origin as the control-system, based on the network classification table 1010. Routing function 427 confirms that the output destination 421 is the first communication I/F 421, using the routing table 910. Filtering function judges that classification of a network of the output destination is the information-system, using the network classification table 1010, and because the input origin is the control-system network, and the output destination is the information-system network, performs encryption using a secrete key of the key for encrypting 446, and outputs wheel rotation number of a data identifier of #152, using sending and receiving function 425. It should be noted that the navigation apparatus 110 acquires thus output data on the information-system network to be utilized for position correction.

In the configuration of FIG. 1, for other example, in the case where a curvature of a curve ahead of the vehicle with the data identifier of #111 is transmitted from the navigation apparatus 110, in the in-vehicle gateway device 10, this information is input to sending and receiving function 425 via the first communication I/F 421. Because an input origin is the first communication I/F 423, network identification function 426 judges the classification of a network of the input origin as the information-system, based on the network classification table 1010. Routing function 427 confirms that the output destination I/F is the third communication I/F 421, using the routing table 910. Filtering function judges that classification of a network of the output destination is the control-system, using the network classification table 1010, and because the input origin is the control-system network, and the output destination is the control-system network, confirms network load of the information-system network 23 of the output destination. By confirming network load once per 30 milliseconds, and if there is the case where network load becomes below 50% in ten times, data of the curvature of a curve ahead, having the data identifier of #111, is output to the control-system network 23, using sending and receiving function 425. It should be noted that thus output data reaches the steering ECU 140 and the braking ECU 150 on the control-system network 23, for performing deceleration and steering operation, so that safe curve travelling is possible automatically.

[Embodiment 2]

In the first embodiment, the typical equipment table 444 was used in generating the network classification table 441 in initialization function 429. However, the typical equipment table 444 has already been set at a production stage of the in-vehicle gateway device 10, and practically in a vehicle system set with the in-vehicle gateway device 10, such a network may be possible that an equipment listed in the typical equipment table 444 is not present at all. Therefore, the second embodiment will be shown, where network classification is determined from bus load and transmission frequency of data of a network in initialization function 429, so that network classification can be performed appropriately, even in such a case.

A system configuration and a hardware configuration are similar as that of the first embodiment. The software configuration is one where the typical equipment table 444 is excluded from the first embodiment. The program for boot 410 and the program for setting 430 are completely the same as in the first embodiment. The program for operation 420 is completely the same, except initialization function 429. Here explanation will be given on initialization function 429 having different processing content.

Figure 18A:
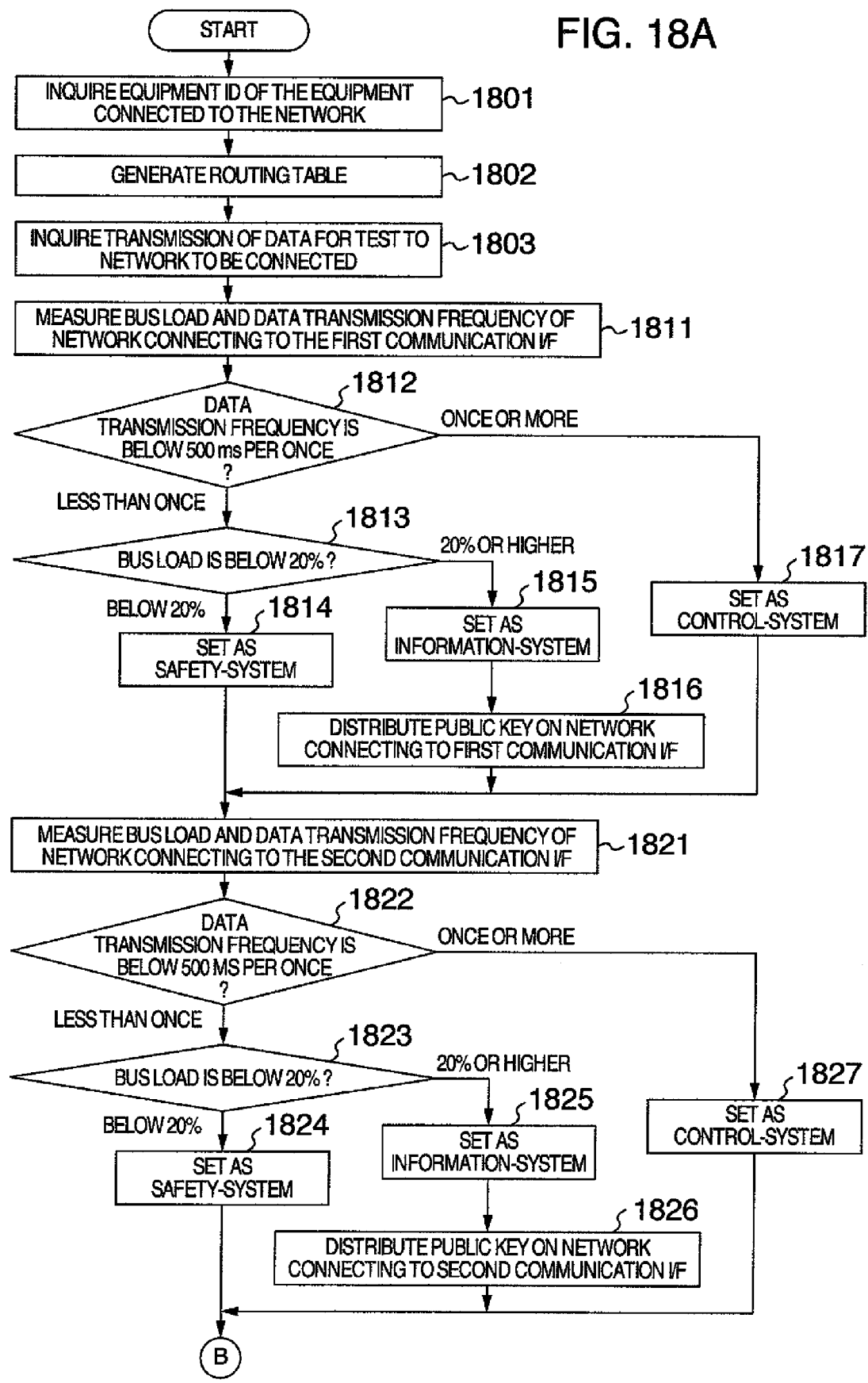
FIGS. 18A and 18B are drawings showing an initialization processing flow of the in-vehicle gateway device of a second embodiment.
Figure 18B:
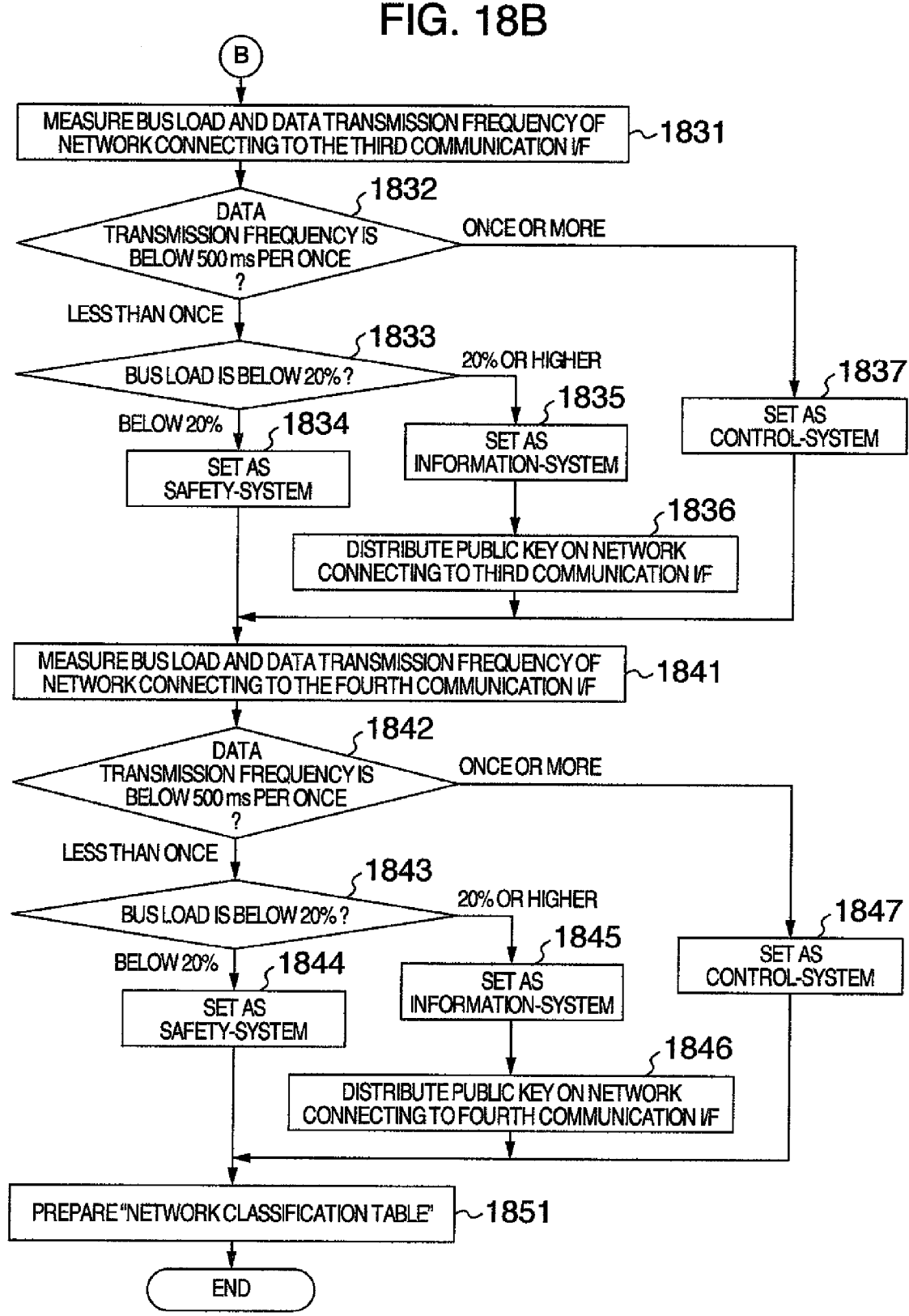

FIG. 18 shows a processing flow of initialization function 429 of the second embodiment.

The program for operation 420 inquires an equipment identifier connecting onto a network, for the network connecting to the in-vehicle gateway device 10. A message of the inquiry obeys the format of FIG. 6, sets "#100" to the command identifier 611 of communication data 610 for initialization, and transmits data, where an equipment identifier "#10" showing the in-vehicle gateway device 10 is set, to the transmission equipment identifier 612. On the other hand, in the system configuration as in FIG. 1, to the first communication part 301, there are input data transmitted from the car navigation device 110, where the command identifier 611 is "#110" and the transmission equipment identifier 612 is "#110", and data transmitted from the DCM 120, where the command identifier 611 is "#110" and the transmission equipment identifier 612 is "#120". To the second communication part 302, there are input data transmitted from the engine ECU 130, where the command identifier 611 is "#110" and the transmission equipment identifier 612 is "#130". To the third communication part 303, there are input data transmitted from the steering ECU 140, where the command identifier 611 is "#110" and the transmission equipment identifier 612 is "#140", and data transmitted from the braking ECU 150, where the command identifier 611 is "#110" and the transmission equipment identifier 612 is "#150". To the fourth communication part 304, there are input data transmitted from the airbag ECU 160, where the command identifier 611 is "#110" and the transmission equipment identifier 612 is "#160" (1801). In initialization function 429, the routing table 442 is prepared, based on such input data and the equipment input/output data table 443 (1802). A preparation flow of the routing table 442, in the case of having the system configuration of FIG. 1 and the equipment input/output data table 710 of FIG. 7, becomes similar to the processing 1502 of FIG. 15.

Bus load and transmission frequency of data of a network connecting to the first communication part 301 are measured (1811). As for the transmission frequency of data measured, whether the transmission frequency is below once per 500 milliseconds or not for the largest data, is investigated (1812). In the case of equal to or more than once per 500 milliseconds, the relevant network is set as the control-system (1816). In the case of below once per 500 milliseconds, whether bus load was below 20% or not at the maximal, is investigated (1813). In the case of below 20%, the relevant network is set as the safety-system (1814). In the case of equal to or more than 20%, the relevant network is set as the information-system (1815). In the system configuration of FIG. 1, it is supposed that the transmission frequency of data of a network connecting to the first communication part 301 was once per second, and the bus load was 50%. Under this setting, because the transmission frequency of data is below once per 500 millisecond (1812), and the bus load is equal to or more than 20% (1813), the relevant network is set as the information-system (1815).

Bus load and transmission frequency of data of a network connecting to the second communication part 302 are measured (1821). As for the transmission frequency of data measured, whether the transmission frequency is below once per 500 milliseconds or not for the largest data, is investigated (1822). In the case of equal to or more than once per 500 milliseconds, the relevant network is set as the control-system (1826). In the case of below once per 500 milliseconds, whether bus load was below 20% or not at the maximal, is investigated (1823). In the case of below 20%, the relevant network is set as the safety-system (1824). In the case of equal to or more than 20%, the relevant network is set as the information-system (1825). In the system configuration of FIG. 1, it is supposed that the transmission frequency of data of a network connecting to the second communication part 302 was once per 30 milliseconds, and the bus load was 20%. Under this setting, because the transmission frequency of data is equal to or more once per 500 milliseconds (1822), the relevant network is set as the control-system (1826).

Bus load and transmission frequency of data of a network connecting to the third communication part 303 are measured (1831). As for the transmission frequency of data measured, whether the transmission frequency is below once per 500 milliseconds or not for the largest data, is investigated (1832). In the case of equal to or more than once per 500 milliseconds, the relevant network is set as the control-system (1836). In the case of below once per 500 milliseconds, whether bus load was below 20% or not at the maximal is investigated (1833). In the case of below 20%, the relevant network is set as the safety-system (1834). In the case of equal to or more than 20%, the relevant network is set as the information-system (1835). In the system configuration of FIG. 1, it is supposed that the transmission frequency of data of a network connecting to the third communication part 303 was once per 30 milliseconds, and the bus load was 20%. Under this setting, because the transmission frequency of data is equal to or more once per 500 milliseconds (1832), the relevant network is set as the control-system (1836).

Bus load and transmission frequency of data of a network connecting to the fourth communication part 304 are measured (1841). As for the transmission frequency of data measured, whether the transmission frequency is below once per 500 milliseconds or not for the largest data is investigated (1842). In the case of equal to or more than once per 500 milliseconds, the relevant network is set as the control-system (1846). In the case of below once per 500 milliseconds, whether bus load was below 20% or not at the maximal is investigated (1843). In the case of below 20%, the relevant network is set as the safety-system (1844). In the case of equal to or more than 20%, the relevant network is set as the information-system (1845). In the system configuration of FIG. 1, it is supposed that the data was not transmitted at all in a network connecting to the fourth communication part 304. Under this setting, because the transmission frequency of data is below once per 500 milliseconds (1842), and the bus load of the network is also below 20% (1343), the relevant network is set as the safety-system (1844).

Initialization function 429 sets classification results of a network connecting to each communication part, obtained as the results of from the processing 1811 to the processing 1847, to the network classification table 441 (1551). In the system configuration case of FIG. 1, a network connecting to the first communication part 301 is judged as the information-system network; a network connecting to the second communication part 302 is judged as the control-system network; a network connecting to the third communication part 303 is judged as the control-system network; and a network connecting to the forth communication part 304 is judged as the safety-system network, and because driver function for the first communication part 301 is the first communication I/F 421, driver function for the second communication part 302 is the second communication I/F 422, driver function for the third communication part 303 is the third communication I/F 423, and driver function for the fourth communication part 304 is the fourth communication I/F 424, such setting is performed that the network classification 1012 for the communication I/F 1011 to be the first communication I/F is the information-system; the network classification 1012 for the communication I/F 1011 to be the second communication I/F is the control-system; the network classification 1012 for the communication I/F 1011 to be the third communication I/F is the control-system network; and the network classification 1012 for the communication I/F 1011 to be the fourth communication I/F is the safety-system network, like the network classification table 1010 of FIG. 10.

The in-vehicle gateway device 10 is capable of determining dynamically a routine table and processing in routing, processing automatic setting of routine function in consideration of network characteristics, and saving trouble of setting work of the in-vehicle gateway device 10.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications within the ambit of the appended claims.

The invention claimed is:

1. A routing method in an in-vehicle gateway device which is connected to a plurality of different networks and performs transmitting and receiving of data between the above networks, the method comprising:
classifying each of the networks into any of an information-system network or a control-system network or a safety-system network, based on data flowing in each of the networks;
determining a destination network of data received from each of the networks, based on a table set in advance; and
processing and editing a data to transfer in response to level of importance of each of the networks, in the case where the above destination network is different from a receiver network;
wherein the classifying further comprises:
monitoring data volume flowing on each network connecting to the in-vehicle gateway device and frequency of transmission of the same kind of data;
classifying such a network that has the transmission frequency of data of equal to or lower than threshold value of transmission frequency set in advance, and has a network bus load rate of over threshold value of the bus load set in advance, as an information-system;
classifying such a network that has the transmission frequency of data of equal to or higher than threshold value of transmission frequency set in advance, and has network bus load rate of over threshold value of the bus load set in advance, as a control-system; and
classifying such a network that has the transmission frequency of data of equal to or lower than the transmission frequency set in advance, and has the network bus load rate of equal to or lower than the bus load set in advance, as a safety-system.

2. A routing method in an in-vehicle gateway device which is connected to a plurality of different networks and performs transmitting and receiving of data between the above networks, the method comprising:
classifying each of the networks into any of an information-system network or a control-system network or a safety-system network, based on data flowing in each of the networks;
determining a destination network of data received from each of the networks, based on a table set in advance; and
processing and editing a data to transfer in response to level of importance of each of the networks, in the case where the above destination network is different from a receiver network;
wherein in transmitting data received from the information-system network to the control-system network, it is confirmed whether a format of data received is correct or not, as well as the bus load of the control-system network as the destination is confirmed, and when the format is correct and the bus load of the control-system network as the destination is equal to or lower than predetermined rate, the data is transmitted to the control-system.

3. A routing method in an in-vehicle gateway device which is connected to a plurality of different networks and performs transmitting and receiving of data between the above networks, the method comprising:

classifying each of the networks into any of an information-system network or a control-system network or a safety-system network, based on data flowing in each of the networks;

determining a destination network of data received from each of the networks, based on a table set in advance; and processing and editing a data to transfer in response to level of importance of each of the networks, in the case where the above destination network is different from a receiver network;

wherein in a case where an input origin of data is the information-network sending to the safety-system network, such data to the safety-system network is destroyed irrespective of content of the routing and data output is not performed to the safety-system network.

4. An in-vehicle gateway device which is connected to a plurality of different networks and performs transmitting and receiving of data between the networks, the gateway device comprising:

a circuit for classifying each of the networks into any of an information-system network or a control-system network or a safety-system network, based on data flowing in each of the networks;

a circuit for determining a destination network of data received from each of the networks, based on a table set in advance; and a circuit for processing and editing a data to transfer in response to level of importance of each of the networks, in the case where the destination network is different from a receiver network;

wherein the circuit for classifying monitors data volume flowing on each network connecting to the in-vehicle gateway device, and frequency of transmission of the same kind of data, classifies such a network that has the transmission frequency of data of equal to or lower than threshold value of transmission frequency set in advance, and has a network bus load rate of over threshold value of the bus load set in advance, as an information-system, classifies such a network that has the transmission frequency of data of equal to or higher than threshold value of transmission frequency set in advance, and has network bus load rate of over threshold value of the bus load set in advance, as a control-system, and classifies such a network that has the transmission frequency of data of equal to or lower than the transmission frequency set in advance, and has the network bus load rate of equal to or lower than the bus load set in advance, as a safety-system.

5. An in-vehicle gateway device which is connected to a plurality of different networks and performs transmitting and receiving of data between the networks, the gateway device comprising:

a circuit for classifying each of the networks into any of an information-system network or a control-system network or a safety-system network, based on data flowing in each of the networks;

a circuit for determining a destination network of data received from each of the networks, based on a table set in advance;

a circuit for processing and editing a data to transfer in response to level of importance of each of the networks, in the case where the destination network is different from a receiver network; and a circuit, in transmitting data received from the information-system network to the control-system network, for confirming whether a format of data received is correct or not, as well as confirming the bus load of the control-system network as the destination, and when the format is correct and the bus load of the control-system network as the destination, is equal to or lower than predetermined rate, for transmitting the data to the control-system.

6. An in-vehicle gateway device which is connected to a plurality of different networks and performs transmitting and receiving of data between the networks, the gateway device comprising:

a circuit for classifying each of the networks into any of an information-system network or a control-system network or a safety-system network, based on data flowing in each of the networks;

a circuit for determining a destination network of data received from each of the networks, based on a table set in advance; and a circuit for processing and editing a data to transfer in response to level of importance of each of the networks, in the case where the destination network is different from a receiver network;

wherein in a case where an input origin of data is the information-network sending to the safety-system network, such data to the safety-system network is destroyed irrespective of content of routing and data output is not performed to the safety-system network.

* * * * *